US010534960B2

(12) United States Patent
Perona et al.

(10) Patent No.: US 10,534,960 B2
(45) Date of Patent: Jan. 14, 2020

(54) SYSTEM AND METHOD FOR LOCATING AND PERFORMING FINE GRAINED CLASSIFICATION FROM MULTI-VIEW IMAGE DATA

(71) Applicants: California Institute of Technology, Pasadena, CA (US); ETH Zurich, Zurich (CH)

(72) Inventors: Pietro Perona, Altadena, CA (US); Steven J. Branson, Pasadena, CA (US); Jan D. Wegner, Zurich (CH); David C. Hall, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 152 days.

(21) Appl. No.: 15/478,101

(22) Filed: Apr. 3, 2017

(65) Prior Publication Data
US 2017/0287170 A1    Oct. 5, 2017

Related U.S. Application Data

(60) Provisional application No. 62/316,959, filed on Apr. 1, 2016.

(51) Int. Cl.
*G06K 9/00* (2006.01)
(52) U.S. Cl.
CPC ....... *G06K 9/0063* (2013.01); *G06K 9/00664* (2013.01); *G06K 9/00791* (2013.01)
(58) Field of Classification Search
None
See application file for complete search history.

(56) References Cited

U.S. PATENT DOCUMENTS

| 7,295,106 | B1* | 11/2007 | Jackson | G06K 9/00771 340/5.8 |
| 8,310,361 | B1* | 11/2012 | Stout | G06F 17/30241 340/539.11 |
| 2012/0314935 | A1* | 12/2012 | Cheng | G06K 9/00671 382/154 |
| 2014/0205189 | A1* | 7/2014 | Cao | G06K 9/6256 382/160 |

(Continued)

OTHER PUBLICATIONS

He et al., "Deep Residual Learning for Image Recognition", Computer Vision and Pattern Recognition, Dec. 10, 2015, retrieved from https://arxiv.org/abs/1512.03385, 12 pages.

(Continued)

*Primary Examiner* — Justin P. Misleh
(74) *Attorney, Agent, or Firm* — KPPB LLP

(57) ABSTRACT

Some embodiments of the invention provide a method for identifying geographic locations and for performing a fine-grained classification of elements detected in images captured from multiple different viewpoints or perspectives. In several embodiments, the method identifies the geographic locations by probabilistically combining predictions from the different viewpoints by warping their outputs to a common geographic coordinate frame. The method of certain embodiments performs the fine-grained classification based on image portions from several images associated with a particular geographic location, where the images are captured from different perspectives and/or zoom levels.

22 Claims, 12 Drawing Sheets

(56) References Cited

U.S. PATENT DOCUMENTS

| | | | | |
|---|---|---|---|---|
| 2014/0369595 A1* | 12/2014 | Pavlidis | ............ | G06K 9/00637 |
| | | | | 382/154 |
| 2016/0019458 A1* | 1/2016 | Kaufhold | ............... | G01S 7/417 |
| | | | | 342/25 F |
| 2016/0110433 A1* | 4/2016 | Sawhney | ........... | G06F 17/2785 |
| | | | | 707/722 |
| 2016/0140438 A1* | 5/2016 | Yang | ....................... | G06N 3/08 |
| | | | | 706/12 |
| 2016/0180535 A1* | 6/2016 | Zalmanson | ........... | G01C 11/06 |
| | | | | 382/103 |

OTHER PUBLICATIONS

Simonyan et al., "Very Deep Convolutional Networks for Large-Scale Image Recognition", Computer Vision and Pattern Recognition, Apr. 10, 2015, retrieved from https://arxiv.org/abs/1409.1556, 14 pages.

Szegedy et al., "Rethinking the Inception Architecture for Computer Vision", Computer Vision and Pattern Recognition, Dec. 11, 2015, retreived from https://arxiv.org/abs/1512.00567, 10 pages.

* cited by examiner

SYSTEM AND METHOD FOR LOCATING AND PERFORMING FINE GRAINED CLASSIFICATION FROM MULTI-VIEW IMAGE DATA

CROSS-REFERENCE TO RELATED APPLICATIONS

The present invention claims priority to U.S. Provisional Patent Application Ser. No. 62/316,959, filed Apr. 1, 2016. The disclosure of U.S. Provisional Patent Application Ser. No. 62/316,959 is herein incorporated by reference in its entirety.

STATEMENT OF FEDERAL FUNDING

This invention was made with government support under Grant No. N00014-10-1-0933 awarded by the Office of Naval Research. The government has certain rights in the invention.

The invention described herein was made in the performance of work under a NASA contract NNN12AA01C, and is subject to the provisions of Public Law 96-517 (35 USC 202) in which the Contractor has elected to retain title.

FIELD OF THE INVENTION

The present invention relates to machine vision and, more specifically, relates to methods for using machine vision to geographically locate elements from images of the element captured from multiple views, or perspectives, and for performing a fine-grained classification of the geographically located elements.

BACKGROUND

As cities grow and public infrastructure expands, it becomes increasingly necessary to search, catalog, and monitor the public infrastructure (e.g., buildings, vegetation, artifacts, street signs, etc.). Spatial databases (so-called Geographic Information Systems (GIS)) are an essential tool for public service departments, city managers and urban planners. They face the need to set up and maintain inventories not only of trees, but also other object classes like street signs, utility poles, or street furniture, to facilitate urban planning, citizen safety, and emergency response plans.

However, the process of cataloging and classifying visible objects in the public space (e.g. street signs, building facades, fire hydrants, solar panels and mail boxes) is a difficult endeavor. Currently, such objects are mapped manually by professional surveyors in labor-intensive and costly field campaigns (e.g., using expensive ad-hoc imagery such as LiDAR). In many cases, the information is not captured or analyzed at all, due to the cost, time, and organizational headache it involves.

SUMMARY OF THE INVENTION

Some embodiments of the invention provide a method for identifying geographic locations and for performing a fine-grained classification of elements detected in images captured from multiple different viewpoints or perspectives. In several embodiments, the method identifies the geographic locations by probabilistically combining predictions from the different viewpoints by warping their outputs to a common geographic coordinate frame. The method of certain embodiments performs the fine-grained classification based on image portions from several images associated with a particular geographic location, where the images are captured from different perspectives and/or zoom levels.

DETAILED DESCRIPTION

Hundreds of millions of cameras are sampling the world and capturing an image of what may be seen from all positions and all points of view, whose resolution in time and space is constantly improving. The global field of view (also called the World-Wide Light Field (WWLF)) that is captured by these images is being sampled with increasing resolution in space and time, giving machines unprecedented access to objects that are in public view. In addition to user-captured images (e.g., using mobile phones, cameras, drones, autonomous vehicles, etc.), online map services (e.g., Gaggle Maps™) provide direct access to huge amounts of densely sampled, geo-referenced images from street view and aerial perspective. Systems and methods in accordance with various embodiments of the invention utilize computer vision systems to search, catalog and monitor real world objects (often referred to as elements) visible within the geo-referenced images.

Several embodiments of the invention provide vision-based systems that systematically detect, geo-locate and perform fine-grained classification for elements based on multi-view images (i.e., images captured from multiple different perspectives or viewpoints). In some embodiments, the system geo-locates the detected objects by combining predictions from the different viewpoints by warping their outputs to a common geographic coordinate frame. The method of some embodiments performs the fine-grained classification based on image portions from several images associated with a particular geographic location, where the images are captured from different perspectives and/or zoom levels. Fine-grained classification can be used to refer to processes that classify members of a visually-similar category into more specific species or sub-groups. Fine-grained classification can be applied to a wide variety of species classification at different levels of specificity.

In many embodiments, data describing geo-located and fine-grain classified elements are processed to provide input to any of a number of different systems including (but not limited to): map layers to GIS and/or mapping services; object location data to autonomous systems such as (but not limited to) control processes for drones and/or self driving cars; and/or object location data to decision support systems. Systems and methods for geolocating and performing fine-grained classification of elements visible from multiple viewpoints in a set of geo-referenced images in accordance with various embodiments of the invention are discussed further below.

System for Geo-Location and Fine-Grained Classification

Figure 1:
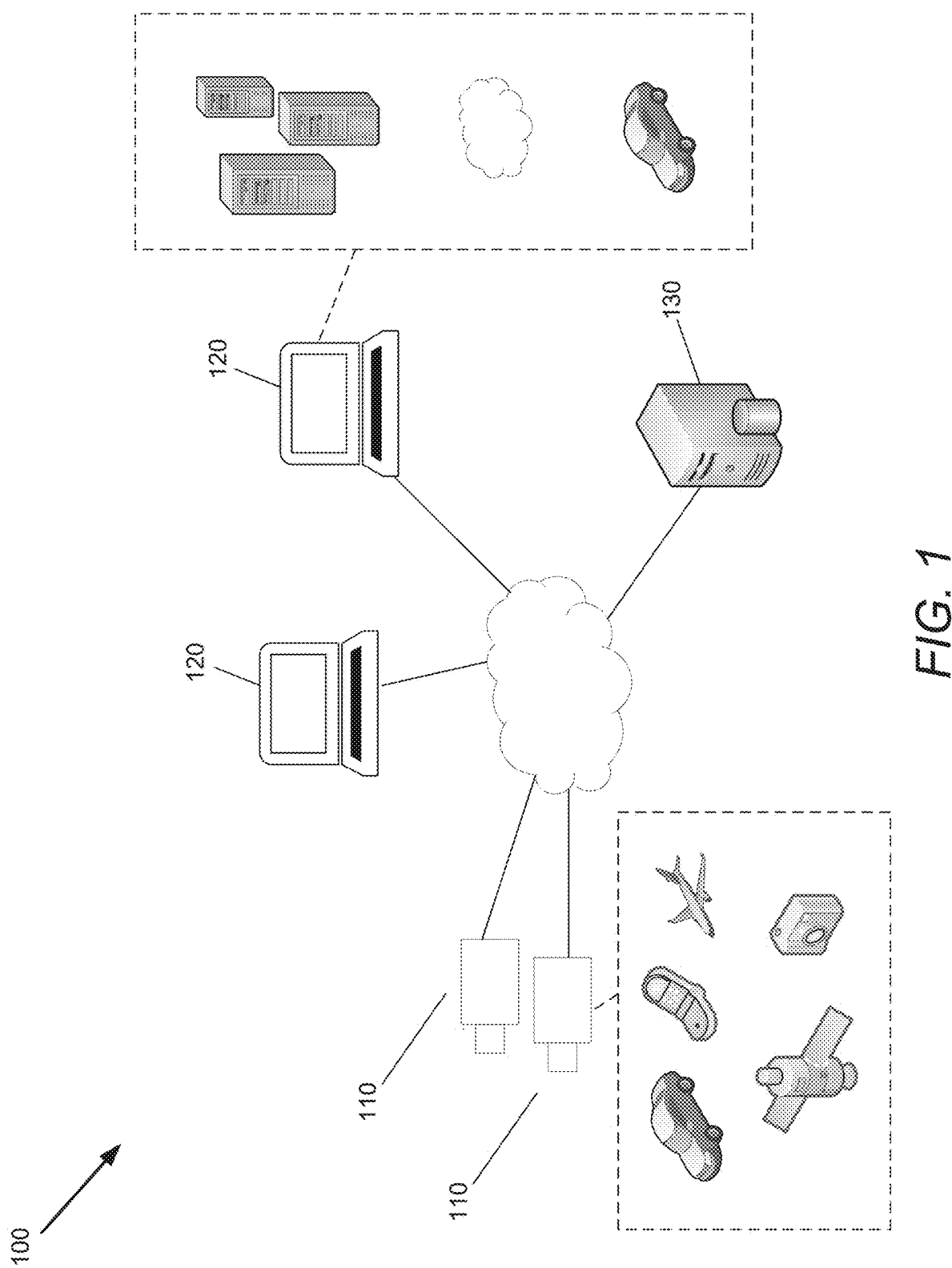
FIG. 1 illustrates an example of a system for capturing and analyzing multi-view images to locate elements and perform fine-grained classification.

FIG. 1 illustrates an example of a system 100 for capturing and analyzing multi-view images to locate elements and perform fine-grained classification. System 100 includes a set of image data capture devices 110, a set of processing elements 120, and a set of output elements 130.

The set of image data capture devices 110 of some embodiments include various types of cameras capable of capturing a real-world element from various perspectives. For example, in some embodiments, the image data capture devices 110 include various user-operated cameras (e.g., mobile phone cameras, single lens reflex (SLR) cameras, point-and-shoot cameras, etc.) to produce user-generated images. In other embodiments, images are captured without user direction (e.g., surveillance cameras, drones, vehicle mounted cameras, and/or imaging systems).

While user-provided photographs cover mostly popular sites, systematic commercial efforts can provide a homogeneous and dense coverage of the populated parts of the world, especially urban areas. This includes overhead imagery captured by various methods (e.g., drones, aircraft, satellites, etc.) as well as high-resolution ground panoramas that are regularly distributed along the road network captured by other means (e.g., vehicle mounted cameras). In some embodiments, the image data capture devices 110 are configured or otherwise programmed to automatically capture images in a uniform manner (e.g., from a common perspective, at regular intervals, etc.). In several embodiments, multiple image data capture devices 110 are utilized to capture image data using multiple imaging modalities (e.g., LiDAR, hyperspectral, etc.).

The image data capture devices 110 of some embodiments are further used to capture additional types of metadata for the captured images, including (but not limited to) a timestamp of when the image was captured, geographic location data (e.g., global positioning system (UPS) data), bearing (i.e., the direction the capture device was facing at the time the image data was captured), inertial measurements (e.g., from an inertial measurement unit (IMU)), aperture, shutter speed, focal length, and/or resolution.

In many cases, the multi-view images (and associated metadata) captured by these various methods are readily available and can be used by organizations for machine vision endeavors. For example, browser-based interfaces (e.g., Google Maps™) provide well-structured access to this rich, up-to-date and geo-coded image data.

The use of multi-view images provides various benefits over previous location and classification methods. Different perspectives of the images are often able to provide very different visual information for the classification and location of various elements. In some embodiments, two points of view, aerial and street-view, are found to complement each other well in locating and classifying different elements. Aerial and street-view images are also readily available from various sources, which can make it cost-effective and efficient to use these particular perspectives. For example, in the case of tree analysis, street views (i.e., views captured at street-level) can serve as a rich data source for recognizing a tree's species based upon factors including (but not limited to) leaf shape, trunk size, and/or texture, while aerial views (i.e., views captured from an elevated perspective) can provide valuable information regarding characteristics of the tree including (but not limited to) the tree's location, and/or the spread and shape of a tree's crown. In addition to the multi-view images, the image data capture devices 110 of some embodiments can also capture various metadata related to the images, such as (but not limited to) the aperture, focal length, shutter speed, resolution, and/or positioning of the camera at the time of capture.

In some embodiments, the image data capture devices 110 are used to capture other types of data to assist with locating and classifying elements from the image data. For example, in some embodiments, the image data capture devices 110 retrieve map information (e.g., street names, street location, street width, number of lanes, etc.) that can be used to refine the geographic location for an element detected in the image data. Alternatively, or conjunctively, the image data capture devices 110 of some embodiment include specialized capture devices (e.g., Light Detection and Ranging (LiDAR) systems, infrared cameras, etc.) for capturing specialized information (e.g., depth, non-visible light spectrum data, etc.).

The system 100 also includes a set of processing elements 120 for analyzing image data (and other related data) to detect elements in the images, identify geographic locations for the detected elements, and perform a fine-grained classification of the geographically located elements. The processing elements 120 include various types of processing resources, such as (but not limited to) servers, cloud services, and/or vehicle systems. The processing elements 120 of many embodiments are distributed across multiple processing elements. For example, the processing elements 120 may include local resources of a device or vehicle system, which performs a first level of detection, while fine-grained classification of the detected elements is performed using cloud services over a network. In many embodiments, the fine-grained classification is achieved by leveraging the power and flexibility of state-of-the-art detectors and classifiers (e.g., based on convolutional neural networks (CNNs)). In several embodiments, the processing elements 120 are used to train several classifiers for different perspectives and/or different zoom levels.

The set of processing elements 120 can then perform a late, probabilistic fusion to combine the outputs of these detectors and classifiers to obtain fine-grained classifications of the geographically located elements. The process for the detection, geo-location, and fine-grained classification of the elements is described in greater detail below.

The system 100 also illustrates output elements 130 for providing various outputs based on the geo-located, fine-grain classified elements from the image data. The output elements 130 include various storage and processing elements (e.g., servers, cloud services, vehicle systems, etc.) for computing and providing such outputs. For example, in some embodiments, the output elements 130 use the geo-located elements to generate a catalog of geo-located elements that can be used to maintain or otherwise monitor the inventory of the geo-located elements in the geographic region. The fine-grained classification of some such embodiments can be used to identify a species (e.g., a plant or tree species) for the geo-located elements. Alternatively, or conjunctively, the fine-grained classification of some embodiments can be used to collect additional data about the geo-located elements, such as (but not limited to) a state (e.g., damaged, healthy, in need of maintenance, etc.), and/or size. The output elements 130 of some embodiments are also used to provide information about the detected elements. For example, in some embodiments, the output elements 130 generate a map layer that includes all of the geo-located elements in a geographic region. With reference to the examples of fine-grained classification of geo-located trees, the generated map layer can allow a user to view the species (or other information) for the detected trees from within a mapping application (e.g., Google Maps™). In other embodiments, the data describing geo-located and fine-grain classified elements can be utilized in any of a variety of ways including (but not limited to) autonomous decision making and/or decision support.

In several embodiments, the system 100 is part of a vehicle's driver assistance system. In a number of embodiments, the image data capture devices 110 include cameras and other specialized sensors (e.g., a LiDAR system) mounted to the vehicle, the onboard computer of the vehicle system constitutes the processing elements 120, and the outputs are displayed to a display (e.g., as a map layer or other visualization) within the vehicle, or as other notifications (i.e., audible or visible) to the driver. In certain embodiments, the geo-located and fine-grain classified elements are provided to a vehicle control/autonomous navigation system within the vehicle, which adjusts the motion plan of the vehicle. In several embodiments, the geo-located and fine-grain classified elements are shared between vehicles via a cloud service, enabling vehicles to motion plan based upon elements, detected by other vehicles, that may not be visible to the vehicle's own image data capture devices. As is discussed further below, fine grained classification and geo-location can be performed in a remote server based upon images captured by multiple image capture devices in different locations and data describing the detected elements can be shared with various systems (e.g., a vehicle proximate to the detected elements).

In some embodiments, the various parts of the system 100 are distributed across several devices and locations. For example, in many embodiments, the image capture devices 110 are operated by a third-party, while the geo-location and fine-grained classification are performed by a device (or software operating on the device). In other embodiments, the processing elements 120 may include local processing resources for the device as well as other storage and processing resources that are accessible through a network (e.g., the Internet). One skilled in the art will recognize that there are many ways for the elements of the system 100 to be divided, and that not all of the elements will be found in every embodiment of the invention.

Geo-Location and Fine-Grained Classification

Figure 2:
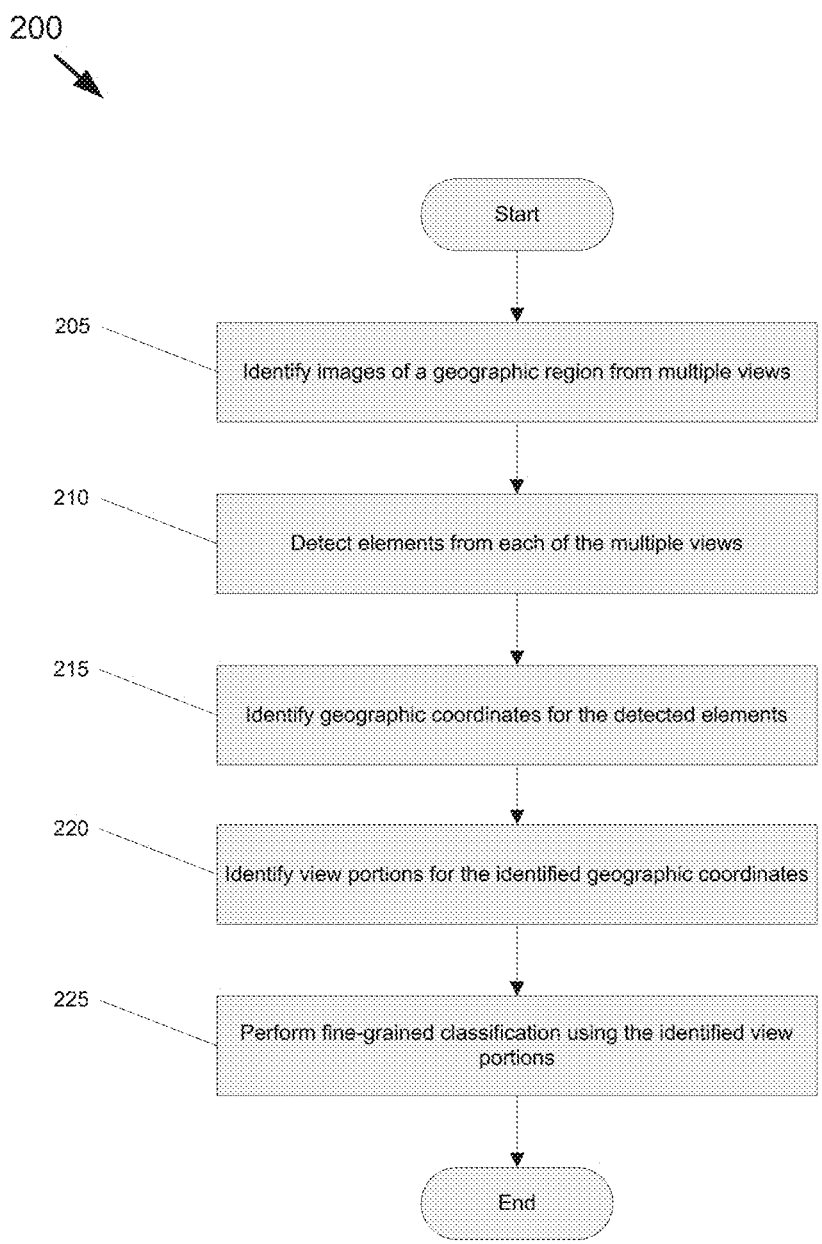
FIG. 2 conceptually illustrates an example of a process for analyzing multi-view images to locate elements and perform fine-grained classification.

A process 200 for analyzing multi-view images to geo-locate and perform fine-grained classification of elements in accordance with several embodiments of the invention is illustrated in FIG. 2. Combining images from multiple views can significantly improve both detection and classification accuracy, allowing for the automation and improvement of geo-location and fine-grained classification of objects from multi-view, geo-referenced images gathered in a geographic region. The process 200 identifies geographic locations of objects (or elements) belonging to a given category, and computes a fine-grained category of the object at a given location. The process 200 of some embodiments uses a combination of state-of-the-art object detectors and classifiers (e.g., based on CNNs) to analyze the multi-view, geo-referenced images.

The process 200 identifies (at 205) images of a geographic region from multiple views (e.g., dynamic scenes with different lighting conditions), or perspectives, which capture the various elements at different times, resolutions, imaging parameters, imaging modalities, and/or angles. In some embodiments, the different views include a street view and an aerial view.

The process 200 then detects (at 210) elements from each of the multiple views. In some embodiments, the detection is performed in multiple stages, with an initial pass to broadly detect potential elements in the figures, and subsequent passes to refine the detections of the elements. The process 200 of some embodiments detects (at 210) elements that belong to a particular category (e.g., trees, buildings, people, vehicles, street signs, etc.) from the individual images.

Once the elements have been detected in the individual images, the process 200 of some embodiments identifies (at 215) geographic coordinates for each of the detected elements to identify a location of the detected element in a real-world space based upon information including (but not limited to) geo-references associated with one or more of the views of the element, estimated baselines between captured views, camera optics, camera pose data, and/or range or depth data. The process 200 of some embodiments identifies the geographic coordinates by warping pixel locations (e.g., a center pixel of a bounding box surrounding a detected element) of the individual images to potential geographic locations defined in a coordinate system, and then combines the potential geographic locations to determine the actual geographic locations for the detected elements.

In some embodiments, the process 200 warps the pixel locations to geographic locations based on a set of projection functions that identify the geographic location based on data related to the pixel locations (e.g., camera height, size of the bounding box, etc.). The process 200 of some embodiments computes different projection functions for each type of image modality v (e.g., street view or aerial view). For example, in some embodiments, the process 200 computes the function $\ell' = \mathcal{P}_v(\ell, c)$, which projects a geographic latitude/longitude location $\ell$ =(lat,lng) to its corresponding image location $\ell'$ =(x,y) given camera parameters c.

Once geographic coordinates for the detected elements of the images have been identified (at 215), the process 200 of some embodiments identifies (at 220) view portions for the identified geographic coordinates in which at least a portion of the detected element is visible. The view portions of some embodiments are portions of the multi-view images that correspond to the identified geographic coordinates and contain the detected element. In some embodiments, the process 200 identifies (at 220) the view portions using a set of inverse projection functions to identify corresponding regions of the multi-view images for each set of geographic coordinates. The process 200 of some embodiments retrieves (e.g., by downloading, cropping, etc.) the view portions from multiple perspectives (e.g., aerial, streetview panoramas, etc.) and at multiple zoom levels and/or resolutions. Such a strategy allows coverage of a single element from various views and at multiple scales that can capture an overall appearance of the element (e.g., a tree), down to lower-level local details (e.g., bark texture, leaf shapes, etc.). As can readily be appreciated, the specific views of an object obtained for the purposes of performing fine grained classification is largely dependent upon the requirements of a given application.

The process 200 of some embodiments then uses the identified view portions, which capture at least a portion of the detected element, to perform fine-grained classification (or subordinate categorization) and identify a species or other attribute of the detected element. As noted above, fine-grained classification can be used to refer to processes that classify members of a visually-similar category into more specific species or sub-groups. Fine-grained classification can be applied to a wide variety of species classification at different levels of specificity.

In some embodiments, the fine-grained classification makes simple determinations about a category of element (e.g., whether a parking space (category) is occupied or not (species)). As another example, the fine-grained classification of some embodiments identifies specific types (e.g., automobile, truck, van, etc.) of vehicles, while in other embodiments, the fine-grained classification can be used at a more detailed level to identify the specific makes and models of vehicles. The process 200 of some embodiments uses fine-grained classification to identify different buildings and classify them by their primary function or type (e.g., retail, residential, etc.). Other embodiments use fine-grained classification for identifying attributes of the detected elements. For example, in some embodiments, the process 200 identifies the gender, age, clothing (e.g., uniforms, business, tourists, etc.) physical condition, etc. of people identified in the multi-view images. The process 200 can be also be useful in monitoring the state and/or physical condition of various elements of public infrastructure (e.g., roads, buildings, work sites, etc.).

Various aspects of the systems and methods described above can be illustrated with reference to the specific application of geo-locating and performing fine-grained classification of trees in an urban area. However, one skilled in the art will recognize that embodiments of the invention are not limited to the specific application of tree identification. As can readily be appreciated, various embodiments of the invention could be used to geo-locate and fine-grain classify any manner of elements (e.g., street signs, buildings, lamp posts, mailboxes, traffic lights, fire hydrants, vehicles, pedestrians, etc.) in various different applications including (but not limited to) producing map layers with element location and classification information, and/or driver assistance systems that provide notifications regarding surrounding elements based on fine-grained classifications.

Although specific processes for analyzing multi-view images to geo-locate and perform fine-grained classification of elements are discussed with respect to FIG. 2, any of a variety of processes for geo-locating and performing fine-grained classification of elements, as appropriate to the requirements of a specific application, can be utilized in accordance with embodiments of the invention.

Tree Classification Example

Figure 3:
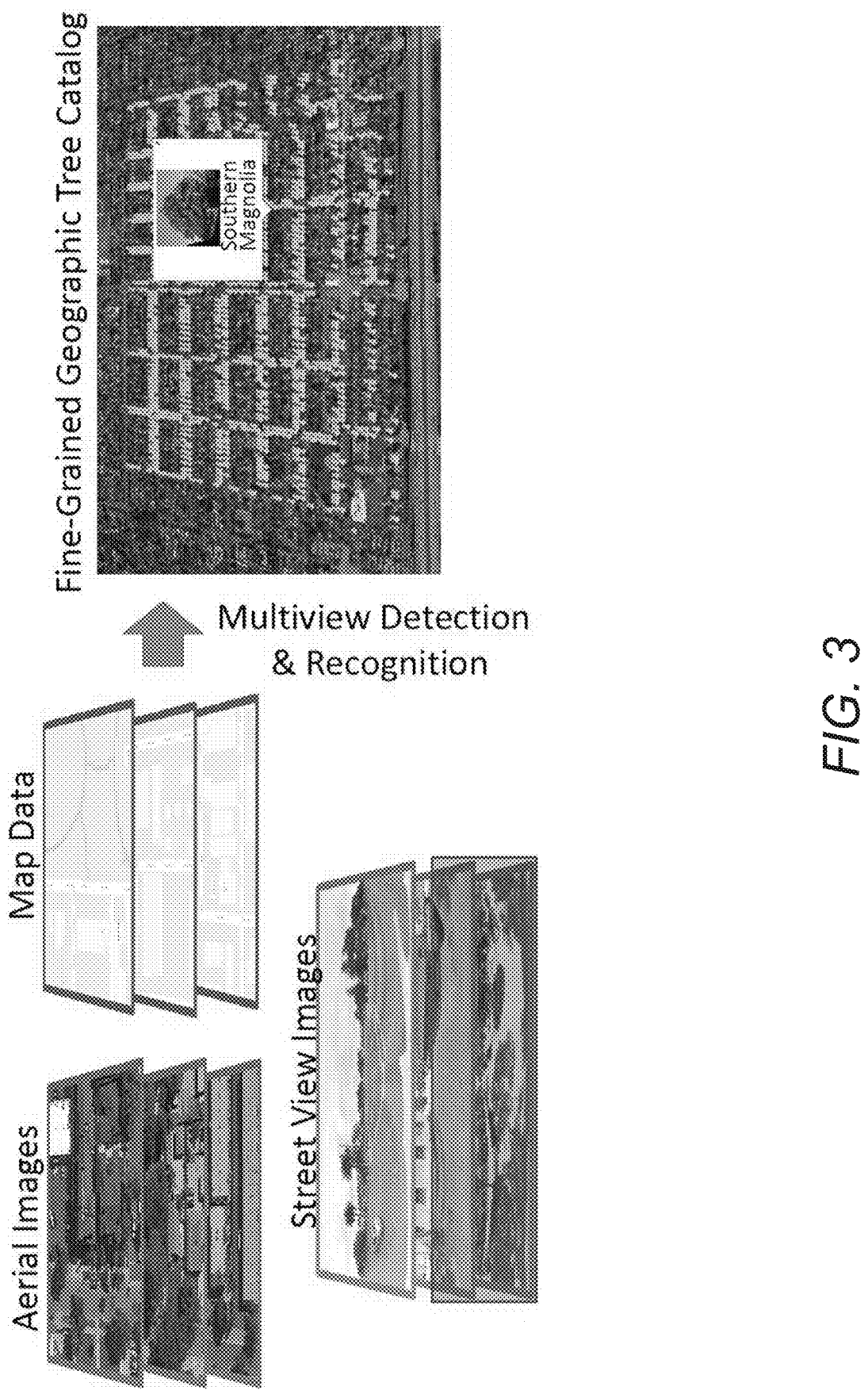
FIG. 3 illustrates an example of analyzing multi-view images to captured image data for trees in an urban area.

FIG. 3 illustrates an example of analyzing multi-view images to captured image data for trees in an urban area. Monitoring trees is important, both at regional and global scale to gain a better understanding of our ecosystem, and related biological and bio-geochemical processes that impact the climate system; and at city-scale because trees can directly impact quality of human life. A healthy canopy can cool cities, decrease energy demand, prevent soil erosion, slow rain-water runoff, and can be key to clean and ample water supply, particularly in arid, densely populated places. The ability to fine-grain classify trees to their specific species can be important as a tree's species can be a significant determinant forest management. For example, if a pest arrives, an entire street could potentially lose its trees, and the ability to react based on the location of a specific species of trees could prove invaluable.

The amount of trees, their exact location, species, age, health and further parameters are often unknown, i.e., no up-to-date database exists. The manual acquisition of tree inventories by professional arborists is costly and slow, whereas crowd-sourcing through educational projects or volunteer work is error-prone and not guaranteed to yield reliable data of sufficient granularity. Using an automated, multi-view image-based system, similar to any of the system described above, could allow cities to build up-to-date, rich tree inventories at large scale.

FIG. 3 shows multi-view images (i.e., aerial images 305 and street view images 310), along with map data 315, which are analyzed to perform multi-view detection and recognition in order to generate a fine-grained geographic tree catalog 320. The multi-view ages 305 and 310 are used for the detection, the geo-location, and the classification of the trees for the fine-grained geographic tree catalog 320. In this example, the multi-view images and map data are much like the images and data that are readily available from existing map services. The use of such readily available data can allow for the creation of a centralized, publicly available, and frequently updated tree inventory for cities around the world.

The detection of the trees and the classification into different species is performed, in some embodiments, by detectors and classifiers (e.g., convolutional networks (CNNs), support vector machines (SVMs), etc.) that are trained on trees that are manually classified. In some embodiments, the classified trees of the training data are identified from existing tree inventory data from counties and cities that were acquired by professional arborists. Alternatively, or conjunctively, the training data can be collected through crowd-sourced data collection, such as via a smartphone applet that tasks users in a crowd-sourcing effort to fill in data gaps. The geo-located and fine-grain classified trees can then be stored in a fine-grained geographic tree catalog 320, which is represented as a map layer that visualizes the location of the different species of trees, thereby allowing a user to find and identify nearby trees.

Naively performing this full detection pipeline can be problematic when combining multiple views (e.g., aerial and street views). Bounding box locations in one view are not directly comparable to another, and problems occur when an object is detected in one view but not the other.

Figure 4:
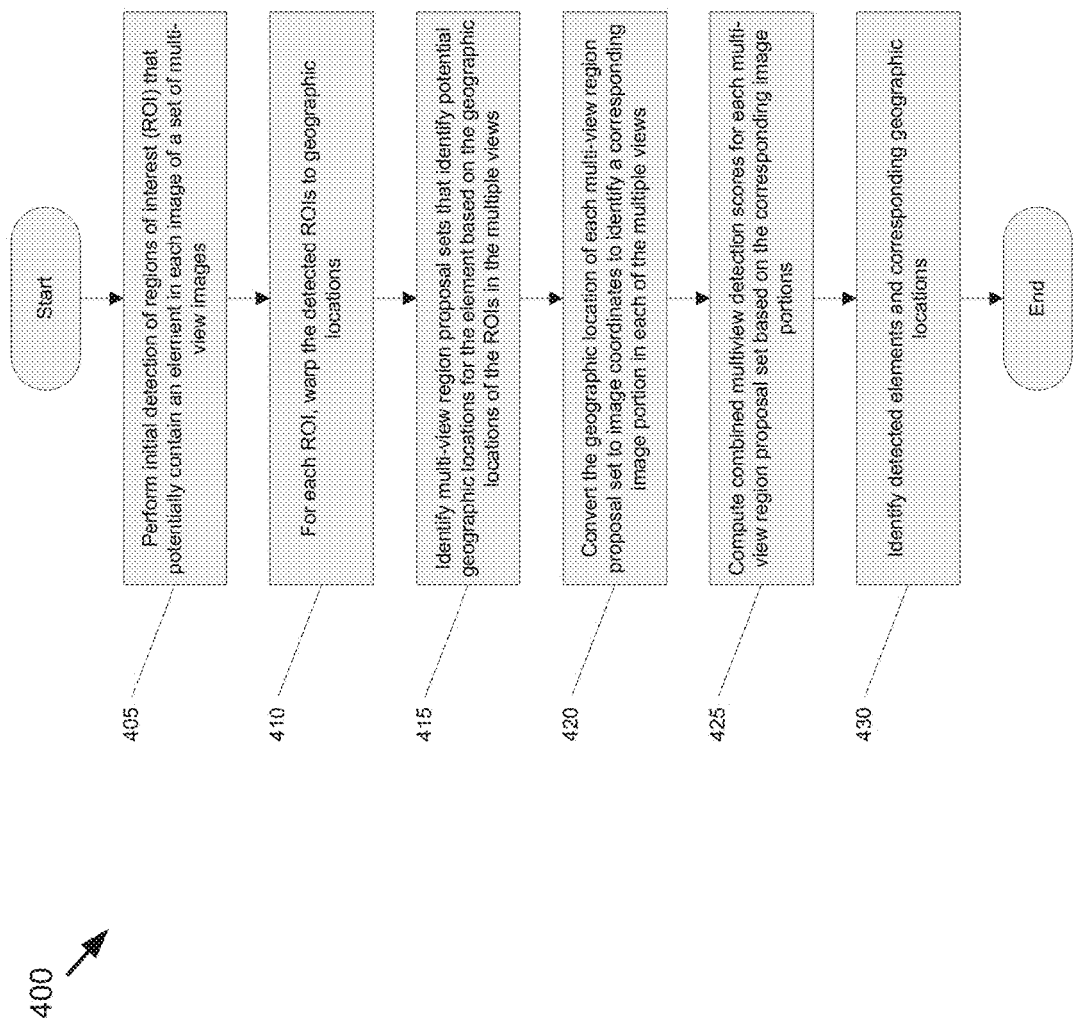
FIG. 4 conceptually illustrates an example of a process for identifying geographic locations for a category of elements from multi-view image data.

FIG. 4 conceptually illustrates an example of a process for identifying geographic locations for a category of elements from multi-view image data. The process 400 of some embodiments is used to generate a geographic catalog of objects belonging to a given category using images from multiple views (e.g., aerial and street-level) of each location. The multi-view image data of some embodiments is captured by the same device that performs the process 400. In other embodiments, existing multi-view image data (e.g., as captured by a third party) is downloaded to the device that performs the process 400. In some embodiments, the process 400 automatically downloads and mutually registers aerial and street view images from service (e.g., Google Maps™). The process 400 documents the appropriate geometric routines needed to register each type of image, such that they can easily be integrated with computer vision algorithms.

A minor complication to using conventional object detection methods is that the the desired outputs (e.g., the geographic locations of the detected elements) are geographic coordinates (e.g., latitude/longitude) or points, rather than bounding boxes. A simple solution is to interpret boxes as regions of interest for feature extraction rather than as physical bounding boxes around an object, when training the detectors, the process 400 converts geographic coordinates (e.g., of previously annotated trees) to pixel coordinates of the images of that tree using the appropriate inverse projection functions $\mathcal{P}_v(\ell,c)$ and creates boxes with size inversely proportional to the distance of the object to the camera. When performing the geo-location, the process 400 converts the pixel location of the center of a bounding box back to geographic coordinates using $\mathcal{P}_v^{-1}(\ell',c)$. As can readily be appreciated, any of a variety of processes can be utilized to identify regions of interest as appropriate to the requirements of a given application.

The process 400 of some embodiments performs (at 405) an initial detection of region of interest (ROI) proposals that potentially contain an element in each image of a set of multi-view images using single-image detectors and a liberal detection threshold. In some embodiments, the single-image detectors are trained separately for each view, or perspective, associated with the multi-view images. For a given test image X, the algorithm produces a set of region proposals and detection scores $R=\{(b_j,s_j)\}_{j=1}^{|R|}$, where each $b_j=(x_j,y_j,w_j,h_j)$ is a bounding box and $s_j$=CNN $(X,b_j;\gamma)$ is a corresponding detection score over CNN features extracted from image X at location $b_j$. The ROI proposals can be understood as a short list of bounding boxes that might contain valid detections.

In some embodiments, before continuing to analyze the ROIs, the process 400 prunes, or filters, the detected ROIs by evaluating detection scores and applying a threshold in order to save compute time. In addition to thresholding the detection scores, the process 400 of some embodiments uses non-maximal suppression to remove overlapping detections.

In some embodiments, the initial detection of ROI proposals is performed using an implementation of Faster R-CNN. Faster R-CNN is a recent state-of-the-art method that significantly improves the speed of R-CNN and Fast R-CNN, all of which are based on CNNs and region proposals. Faster R-CNN and Fast R-CNN are described in *Faster R-CNN: Towards Real-Time Object Detection with Region Proposal Networks* and *Fast R-CNN*. (S. Ren, K. He, R. Girshick, and J. Sun. *Faster R-CNN: Towards Real-Time Object Detection with Region Proposal Networks*, Advances in Neural Information Processing Systems (NIPS), 2015; R. Girshick. *Fast R-CNN*, International Conference on Computer Vision (ICCV) 2015). The relevant disclosures of these papers is hereby incorporated by reference in their entirety. As can readily be appreciated, any of a variety of techniques appropriate to the requirements of a given application can be utilized to generate ROI proposals and detection scores.

For a given test image X, the algorithm produces a set of ROI proposals and detection scores $R=\{(b_j,s_j)\}_{j=1}^{|R|}$, where each $b_j=(x_j,y_j,w_j,h_j)$ is a bounding box and $s_j$ is a corresponding detection score over features extracted from that bounding box. A CNN is trained for both generating region proposals and computing detection scores. Although we use Faster R-CNN, our method can work with any major object detection algorithm, including methods that use region proposals or methods that compute detection scores in sliding window fashion.

For each ROI, the process 400 warps (410) the detected ROI to identify a geographic location associated with the particular bounding box (and the potential element within) using a common coordinate system. In some embodiments, the process 400 warps the detected ROI based on location data (e.g., GPS data) associated with the multi-view images and a set of projection functions used to compute geographic coordinates for the ROI. Projection functions are described in further detail below with reference to FIGS. 7 and 8.

At 415, the process 400 identifies multi-view region proposal sets that identify potential geographic locations for an element based on the geographic locations of the ROIs in the multiple views. The multi-view region proposal set identifies specific geographic locations where an element is likely to be located based on the detections of the element in the multi-view images. In some embodiments, the process 400 compiles a multi-view region proposal set R by taking the union of all view proposals $R_v$ after warping them into geographic coordinates $R=\{\mathcal{P}_v^{-1}(\ell_{vj},c_v)\}_{j=1}^{|R_v|}$, where $\ell_{vj}$ is the pixel location of the jth region center.

The detection of the element at a first geographic location in a first view can be augmented by the detection of the same element at the same (or similar) first geographic location in a second view. While previous methods have attempted to identify correspondence between different views based on an exact, point-wise correspondence search between images of the different views, the process 400 avoids such a search and rather searches for correspondence between geographical locations (or coordinates) associated with the detected elements found in the images of the different views.

In some embodiments, the correlation between the geographic locations of the different views is based on a computed (log) detection probability map $p'_v(x,y)$ over pixel locations for each view v, where $p'_v(x,y)=\exp w_v(x,y)d_v(x,y)$ and $d_v(x,y)$ is the object detection score and $w_v(x,y)$ is some learned confidence scaler that factors in the expected projections of the objects in the image region. The process 400 of some such embodiments then warps each detection probability map to latitude/longitude coordinates $p_v(lat,lng)=p'_v(world_pixel_coords_v(lat,lng))$ and multiplies each view together $p(lat,lng)=\Pi_v p_v(lat,lng)$. The process 400 then applies non-maximal suppression in the combined probability map. As can readily be appreciated, any of a variety of techniques for determining the correlation or consistency of detected objects in different views can be utilized as appropriate to the requirements of a given application.

Once the multi-view image region proposal sets (i.e., the proposed geographic locations for the detected elements) have been identified, the process 400 converts (at 420) the geographic location of each multi-view image region proposal set back to image coordinates (e.g., x and y coordinates in the image space). The process 400 can convert the geographic locations back to image coordinates for the images of each view such that the detection scores for the different views can be computed with a known alignment (or correlation) between each view. In some embodiments, inverse projection functions are used to identify a set of pixels in each image that correspond to the geographic location. The set of pixels can be defined by a bounding box, where the size of the bounding box is inversely proportional to the distance of the object to the camera. As can readily be appreciated, any of a variety of techniques for identifying a set of pixels containing an element can be utilized as appropriate to the requirements of a given application.

The process 400 then computes (at 425) a combined multi-view detection score for each multi-view region proposal set based on the corresponding image portions. In some embodiments, the combined multi-view detection score indicates the likelihood that an element is located at the geographic location of a particular multi-view region proposal. The calculation of the combined multi-view detection score augments the results of the object detection systems applied to the different views with spatial constraints and semantic map data (e.g., the location of roads). The multi-view detection score of a geographic coordinate is obtained by combining the corresponding detection scores in each view, and thresholding and non-maximal suppression occurs over regions represented in geographic coordinates rather than in pixel coordinates of any one view. The calculation of the combined multi-view detection score is described in further detail below with reference to FIG. 5.

The process 400 identifies (at 430) detected elements and corresponding geographic locations for each detected element. In some embodiments, the detected elements and corresponding geographic locations are stored in a catalog of elements to provide visibility to the location of the various elements in the geographic space.

In some embodiments, the calculation of a combined multi-view detection score is a straightforward sum of the detection scores from the multiple views. However, a limitation of such a simple approach is that the results are suboptimal when some views are more reliable sources of information than others. In some embodiments, the combined multi-view detection scores are combined probabilistically (e.g., using a conditional random field (CRF)) and also include other sources of information. The probabilistic combination of the various components allows for different weights and constraints to be applied in scoring the multi-view detections. Such an approach allows for a better multi-view detection score that can account for differences in the available information of the multiple views, such as when the region proposal or detection system fails in a subset of the views (e.g., due to occlusion, poor image quality, etc.).

While specific processes for identifying geographic locations for a category of elements from multi-view image data are described above with reference to FIG. 4, any of a variety of processes for detecting and determining geographic locations of categories of 3D objects can be utilized as appropriate to the requirements of specific applications. Processes for determining the geographic locations of trees based upon geo-referenced images captured of the trees from multiple viewpoints in accordance with a number of embodiments of the invention are discussed below.

Probabilistic Combination of View Detection Scores

Let T be a candidate set of object detections, where each $t_i \in T$ represents an object location in geographic coordinates. Let lat(t) and lng(t) be shorthand for the latitude and longitude of t. The goal of calculating the probabilistic combined multi-view detection scores is to be able to choose the best set of objects T that factors in different sources of information, including aerial view imagery, street view imagery, semantic map data (e.g., the location of roads), and spatial context of neighboring objects. In some embodiments, the combined multi-view detection scores combine the different sources of information using a conditional random field (CRF), as follows:

$$\log p(T) = \sum_{t \in T} \left( \underbrace{\Lambda(t, T; \alpha)}_{\text{spatial context}} + \underbrace{\Omega(t, mv(t); \beta)}_{\text{map image}} + \underbrace{\Psi(t, av(t); \gamma)}_{\text{aerial view image}} + \sum_{s \in sv(t)} \underbrace{\Phi(t, s; \delta)}_{\text{street view images}} \right) - Z \qquad (1)$$

where $\Lambda( )$, $\Omega( )$, $\Psi( )$, and $\Phi( )$ are potential functions with learned parameters $\alpha$, $\beta$, $\delta$, $\gamma$, av(t) and mv(t) are the IDs of aerial and map view images that contain object t, sv(t) is the ID of the set of street view images where t is visible (with associated meta data defining the camera position), and Z is a normalization constant. These terms are discussed further below in the context of a description of various processes for calculating probabilistic combined multi-view detection scores.

Figure 5:
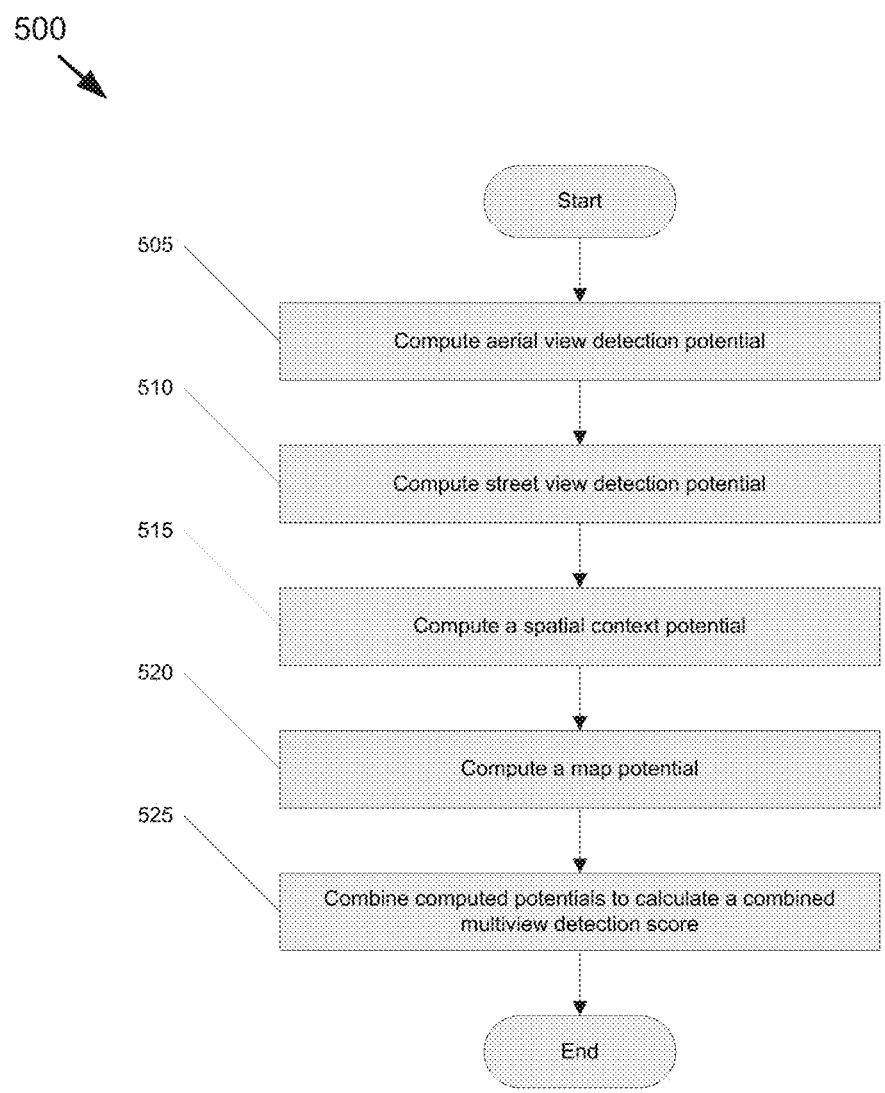
FIG. 5 conceptually illustrates a process for calculating a probabilistic combined multi-view detection score.

FIG. 5 conceptually illustrates a process 500 for calculating a probabilistic combined multi-view detection score. The process 500 computes (at 505) an aerial view potential for images of the aerial view. In some embodiments, the aerial view potential is a detection score for a region of the image (e.g., the image region associated with the geographic location of a particular multi-view region proposal):

$$\Psi(t, av(t); \gamma) = \text{CNN}(X(av(t)), \mathcal{P}_{av}(t); \gamma) \qquad (2)$$

where X(av(t)) is the aerial image, $\gamma$ encodes the weights of the aerial view detection CNN, and $\mathcal{P}_{av}(t)$ transforms between pixel location and geographic coordinates.

The process 500 then computes (at 510) a street view potential for images of the street view. In some embodiments, the street view potential is a detection score for a region of the image (e.g., the image region associated with the geographic location of a particular multi-view region proposal). The potential function for a street view image $s \in sv(t)$ is represented as:

$$\Phi(t, s; \delta) = \text{CNN}(X(s), \mathcal{P}_{sv}(t, c(s)); \delta) \qquad (3)$$

where X(s) is a street view image, $\delta$ encodes the weights of the street view detection CNN, and $\mathcal{P}_{sv}(t,c)$ is a projection function for street view images, defined in Equation 11, described in the Projection Functions section below. As noted above, process 500 of some embodiments calculates the single view (e.g., aerial, street-view, etc.) detection scores (i.e., potentials) using detectors (e.g., CNNs) that are trained specifically for each of the different views.

Note that each object t might be visible in multiple images of a particular view (e.g., street view). In some embodiments, the potential for the particular view is calculated based on all images that were taken within a prespecified distance threshold $\tau_{sv}$ between t and the camera location c(s). In other embodiments, the potential for the particular view is calculated based on a single image that is closest to the proposed object location t. In some cases, the use of a single, closest image provides better results than simply including more images, due in part to a lower likelihood of occlusion and the effect of camera heading error. However, in some embodiments, the benefits of multiple images are balanced with the potential errors by inversely weighting their influence with distance from the object.

The process 500 of some embodiments also computes (at 515) a spatial context potential. The purpose of the spatial context potential is to impose a prior on the distance between neighboring objects. For example, two trees cannot physically grow in the same location and are unlikely to be planted in very close proximity. At the same time, neighboring trees are often planted in regularly spaced intervals parallel to the road. Let $d_s(t,T) = \min_{t' \in T} \|t-t'\|^2$ be the distance to the closest neighboring object, and $Q_s(d_s(t,T))$ be a quantized version of $d_s$. That is, $Q_s( )$ is a vector in which each element is 1 if $d_s$ lies within a given distance range and 0 otherwise. The process 500 of some embodiments learns a vector of weights $\alpha$, where each element $\alpha_i$ can be interpreted as the likelihood that the closest object is within the appropriate distance range. Thus, in some embodiments, $$\Lambda(t,T;\alpha)=\alpha \cdot Q_s(d_s(t,T)) \quad (4)$$

In other embodiments, the process 500 uses a term that forbids neighboring objects to be closer than $\tau_{nms}$ $$\Lambda_{nms}(t, T:\alpha) = \begin{cases} -\infty & \text{if } d_s(t, T) < \tau_{nms} \\ 0 & \text{otherwise} \end{cases} \quad (5)$$

Such an approach is analogous to a traditional non-maximal suppression term that suppresses overlapping bounding boxes. However, the learned approach has the advantage that it can learn to softly penalize objects from being too close. It can also learn that it is unlikely for an object such as a tree to be completely isolated from other trees.

The process 500 of some embodiments also computes (at 520) a map potential. The process 500 of some embodiments computes the map potential based on additional semantic information that provides useful priors for detection. Intuitively, an object such as a tree is unlikely to lie in the middle of the road. Moreover, trees are often planted alongside roads at a fixed distance. In some embodiments, street view images are analyzed using simple image processing techniques to compute the distance from each pixel to the nearest road. Let $d_m(t)$ be the distance in meters between an object t and the closest road. Similar to the spatial context term, quantize this distance into geometrically increasing intervals and learn a prior $\beta_i$ on each interval:

$$\Omega(t,mv(t);\beta)=\beta \cdot Q_m(d_m(t)) \quad (6)$$

The process 500 then combines (at 525) the computed potentials to calculate the combined multi-view detection score. In some embodiments, the multi-view detector that is used to calculate the combined multi-view detection score is trained to learn parameters $\alpha^*,\beta^*,\delta^*,\gamma^*=\arg \max_{\alpha,\beta,\delta,\gamma} \log(p(T))$ that maximizes the detection CRF described with reference to Equation 1 above, where T is the set of objects in a training set. In some embodiments, the learning is performed using piecewise training, which performs well and offers convenience in terms of optimization and modularity. The detector of some embodiments is trained by subdividing the training set into a validation set $\mathcal{D}_v$ and training set $\mathcal{D}_t$, then learning each parameter vector $\alpha,\beta,\delta,\gamma$ separately over their respective potential terms before learning a weighted combination of each potential term on the validation set. As can readily be appreciated, any training technique appropriate to the requirements of a given application can be utilized.

Once the combined multi-view detection scores for the multi-view region proposals are computed, a catalog of object detections $T^*=\arg \max_T \log(p(T))$ are selected to maximize the detection CRF described with reference to Equation 1 above. The method of some embodiments iteratively adds new detections using a greedy algorithm. Beginning with $T=\emptyset$, the method iteratively appends a new detection $$t' = \arg\max_t \log(p(T \cup t)) \quad (7)$$

stopping when no new object can be found that increases log p(T). This is efficient to compute because the combined detection score $\Omega(t,mv(t);\beta)+\Psi(t,av(t);\gamma)+\Sigma_{s\in sv(t)}\Phi(t,s;\delta)$ can be precomputed for each location t in the combined multi-view region proposal set R. The computation of the spatial term $\Lambda(t,T;\alpha)$ can then be updated every time a new detection t' is added. This greedy procedure is a very commonly used procedure in object detection and is a well known probabilistic interpretation of non-maximal suppression that has known approximation guarantees for some choices of $\Lambda(\ )$.

While specific processes for calculating a probabilistic combined multi-view detection score are described above with reference to FIG. 5, any of a variety of processes for calculating the probabilistic combined multi-view detection score can be utilized as appropriate to the requirements of specific applications.

Identifying Geographic Locations of Elements

Figure 6:
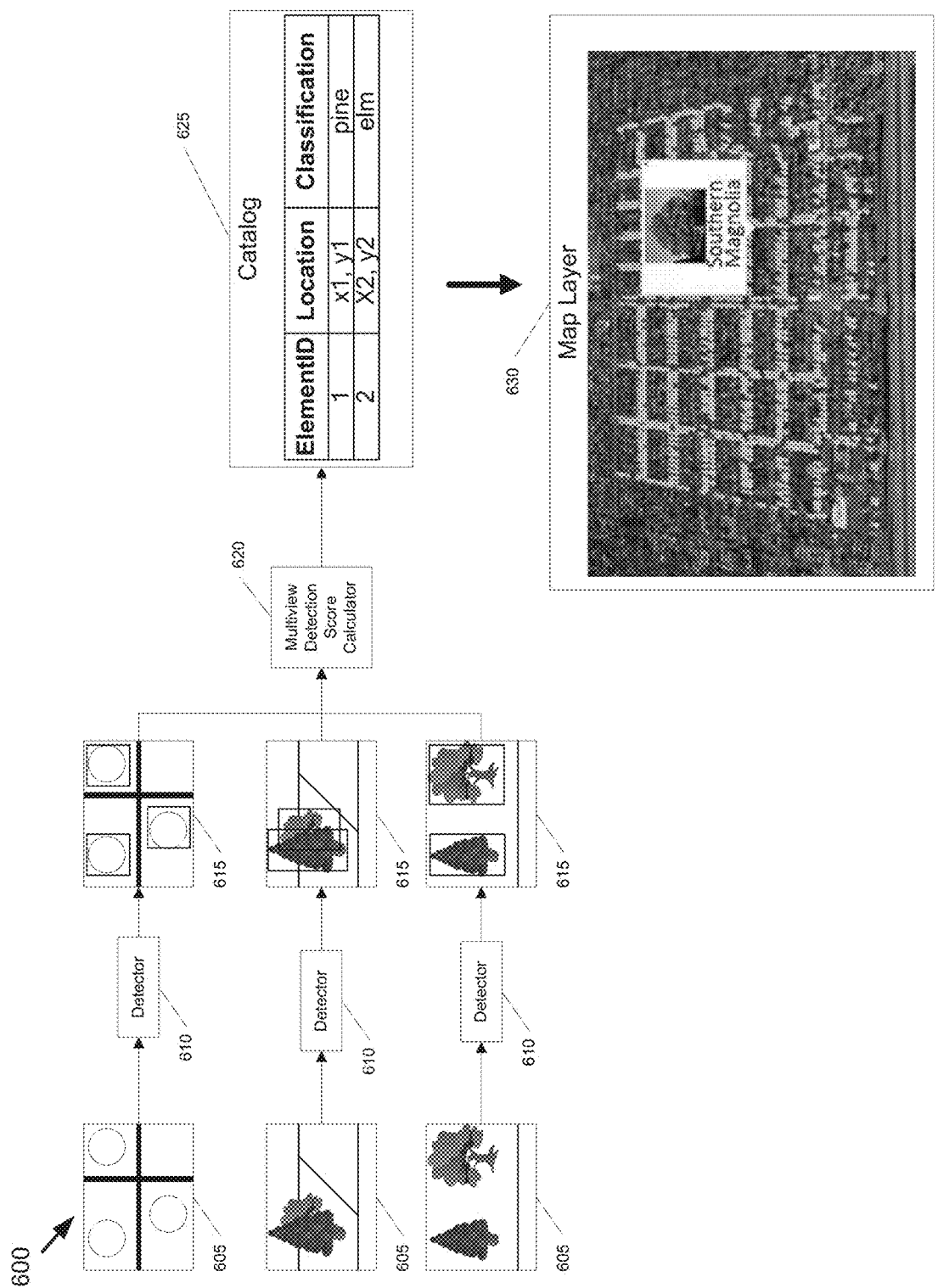
FIG. 6 illustrates an example of identifying geographic locations for trees from multi-view image data.

A process for identifying geographic locations of trees from multi-view geo-referenced image data in accordance with an embodiment of the invention is illustrated in FIG. 6. The process 600 utilizes multiple images in which a specific geographic location is visible to detect the presence of a 3D object of interest at a geographic location visible within one or more of the images. In the illustrated embodiment, the process accepts geo-referenced images 605 from an aerial view, and multiple street view images captured from different viewpoints (as opposed to from the same viewpoint with different levels of zoom). As can readily be appreciated, the specific viewpoints, resolutions and/or zoom levels used to capture images from which 3D objects can be detected and/or their geographic locations determined is largely dependent upon the requirements of a given application.

As noted above, an initial detection of region of interest (ROI) proposals can be performed using single-image detectors 610 with respect to each of the images to identify image ROIs 615 that potentially contain an element. These ROI proposals can be utilized to generate likelihood scores. In several embodiments, the likelihood scores are determined for each viewpoint and a combined detection score can be determined. In other embodiments, the likelihood score can be computed based upon the combined views of a given ROI. As can readily be appreciated, the specific approach to determining whether a ROI contains a tree (or other 3D object) of interest is largely dependent upon the requirements of a given application. For an ROI in which a tree is detected, an appropriate projection function can be applied to the ROI to warp the ROI into a coordinate system from which the geographic location of a detected tree can be determined.

In several embodiments, 3D objects detected in specific locations can be added to a catalog 625 and the catalog used for purposes including (but not limited to) generation of a map layer 630. In the illustrated embodiment, the catalog can include an index, a geographic location (e.g. x, y relative to a map layer, or latitude, longitude, and altitude), and a coarse classification. As discussed further below, the catalog can then be used to retrieve images in which the geographic locations associated with one or more of the 3D objects described in the catalog are visible. The retrieved images can then be utilized to perform fine grained classification of the 3D objects within the catalog, enabling annotation of the 3D objects described by the data forming the catalog with additional data describing the characteristics of the 3D object.

While specific processes for identifying geographic locations of trees from multi-view geo-referenced image data are described above with reference to FIG. 6, any of a variety of processes can be utilized to detect the presence of 3D objects within geo-referenced images and to determine the geographic locations of the detected 3D objects based upon geo-referenced images of the detected 3D objects captured from multiple viewpoints. Processes for determining the geographic location of objects visible within geo-referenced images using projection functions in accordance with various embodiments of the invention are discussed further below.

Projection Functions

Projection functions $\mathcal{P}_v(\ell,c)$ can be utilized to convert from geographic locations to pixel locations in images captured from multiple viewpoints (e.g., aerial view and street view). Inverse projection functions $\mathcal{P}_v^{-1}(\ell',c)$ can be utilized to convert pixel locations in images to geographic coordinates. Different views will often use different projection functions to convert between pixel locations and geographic locations due to the differences in camera angle and placement relative to the detected objects.

Aerial view imagery is often represented using a Web Mercator projection, a type of cylindrical map projection that unwraps the spherical surface of the earth into a giant rectangular image. Map images often contain drawings of features such as (but not limited to) streets, buildings, paths, gardens, parking structures, and/or parks. Map images are pixelwise aligned with aerial view images and are subject to the same projection functions.

A pixel location $\ell'=(x,y)$ is computed from a geographic location $\ell=(lat,lng)$ in radians, as $(x,y)=\mathcal{P}_{av}(lat,lng)$:

$$x=256(2^{zoom})(lng+\pi)/2\pi$$

$$y=256(2^{zoom})(\frac{1}{2}-\ln[\tan(\pi/4+lat/2)]/2\pi) \quad (8)$$

where zoom defines the resolution of the image.

Using simple algebraic manipulation of Eq. 8, the inverse function $(lat,lng)=\mathcal{P}_{av}^{-1}(x,y)$ can be computed as:

$$lng = \frac{\pi x}{128(2^{zoom})} - \pi \quad (9)$$

$$lat = 2\ \tan^{-1}\left(\exp\left(\pi - \frac{y\pi}{128(2^{zoom})}\right)\right) - \frac{\pi}{4}$$

Street view images are often captured using a camera mounted vehicle that traverses roads and captures images of the surrounding area. In some embodiments, each street view image captures a full 360 degree panorama and is an equidistant cylindrical projection of the environment as captured by a camera (e.g., a camera mounted on top of a vehicle). The car is equipped with other instruments to record its camera position c, which includes the camera's geographic coordinates lat(c), lng(c), and the car's heading yaw(c) (measured as the clockwise angle from north). The images captured by such a vehicle are often captured are regular intervals (e.g., 15 m apart).

The projection function for a street-view image estimates the geographic coordinates of an object from a single street view panorama under the assumption of known camera height and locally flat terrain. In some embodiments, the detected object is represented in Local east, north, up (ENU) coordinates with respect to the position of the camera.

Figure 7:
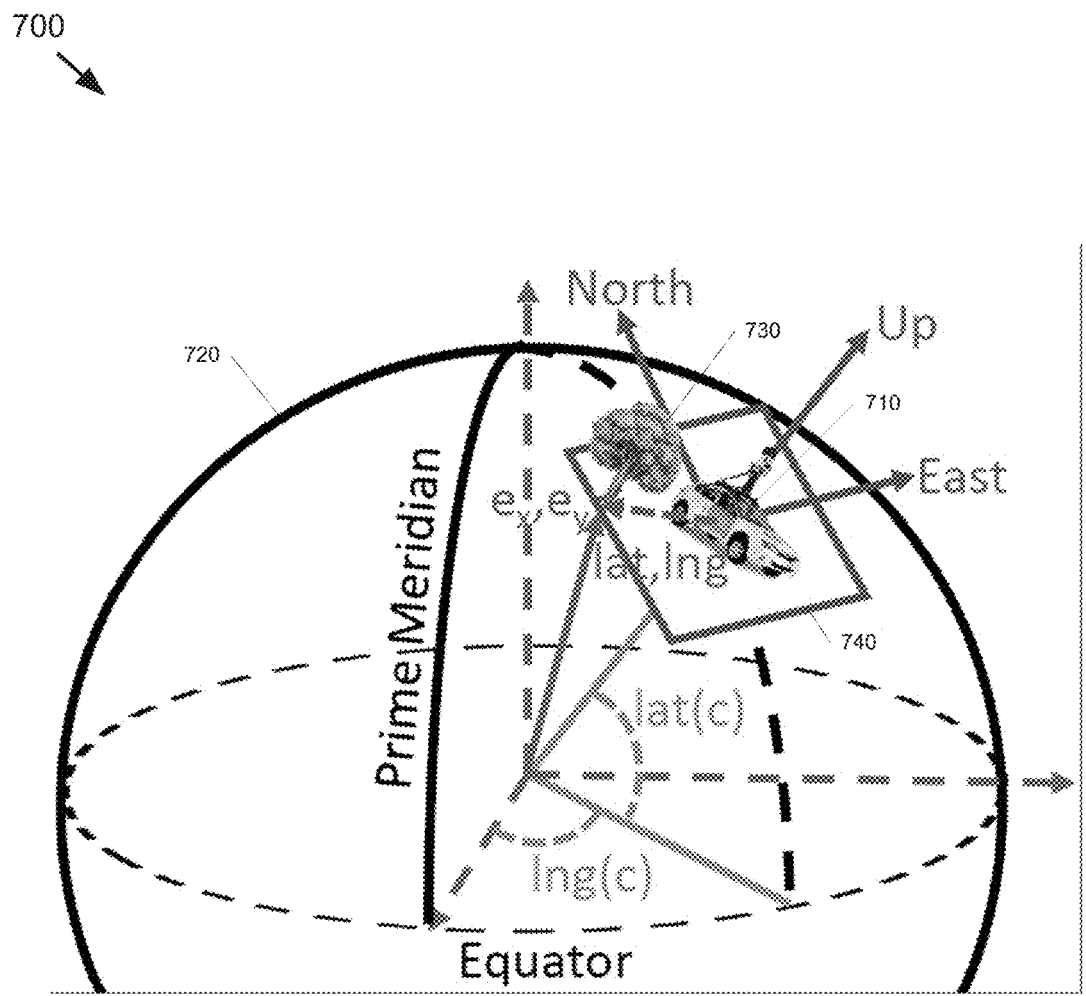
FIG. 7 illustrates the use of projection functions to locate elements from image data within a coordinate system.
Figure 8:
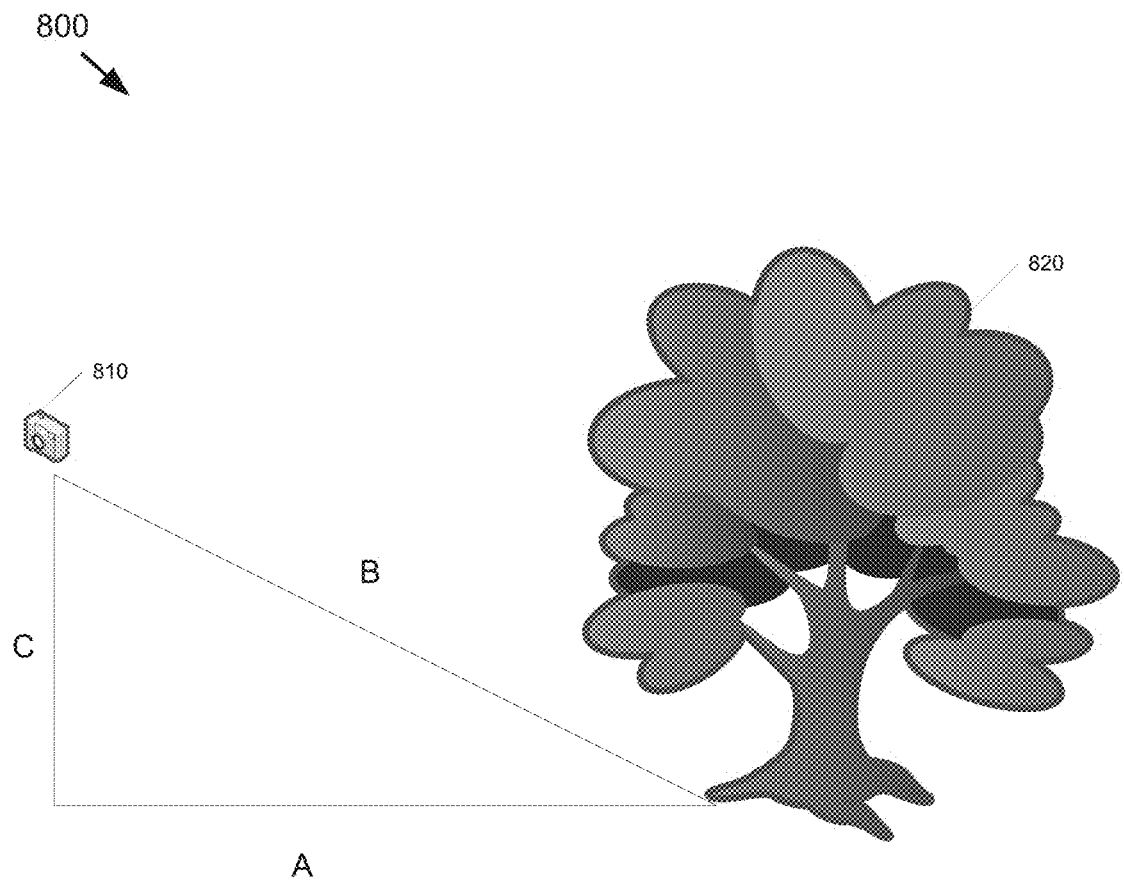
FIG. 8 illustrates the measurement of distance to an element from images captured by a camera.

FIG. 7 illustrates the use of projection functions to locate elements from image data within a coordinate system. A camera-mounted vehicle 710 sits on the surface of the earth 720 at coordinates (lat,lng). A tree 730 is represented in ENU coordinates formed by a plane 740 tangent to the surface of the earth at lat(c), lng(c) at the location of the camera-mounted vehicle 710. FIG. 8 illustrates the measurement of distance to an element from images captured by a camera. This figure shows the simple trigonometric relationship between the camera 810 and a tree 820 to estimate a tree's geographic coordinates from a single street view panorama.

Returning to FIG. 7, a coordinate system is defined for the tangent plane 740, where the x-axis points east, the y-axis points north, and the z-axis points up. The ENU position of an object sitting on the ground at (lat,lng) is $(e_x,e_y,e_z)=(R\ \cos[lat(c)]\sin[lng-lng(c)],$ $R\ \sin[lat-lat(c)],-h) \quad (10)$ where h is the height that the Google™ street view camera is mounted above the ground and R is the radius of the earth.

The object is then at a distance $z=\sqrt{e_x^2+e_y^2}$ from the camera-mounted vehicle 710 (measured on the ground plane) and sits at a clockwise angle of arc $\tan(e_x,e_y)$ from north, and a tilt of arc $\tan(-h,z)$. The heading of the car 710 rotates about this point to determine the tree's location in a panorama image. The ENU coordinates can be converted into cylindrical coordinates using the camera's heading to obtain image coordinates $\ell'=(x,y)$. The resulting image projection $(x,y)=\mathcal{P}_{sv}(lat,lng,c)$ is computed as $x=(\pi+\text{arc}\ \tan(e_x,e_y)-yaw(c))W/2\pi$ $y=(\pi/2-\text{arc}\ \tan(-h,z))H/\pi \quad (11)$ where the panorama image is W×H pixels.

Using simple algebraic and trigonometric manipulation of Eq. 11, the inverse function $(lat,lng,y)=\mathcal{P}_{sv}^{-1}(x,y)$ can be computed as:

$lat=lat(c)+\text{arc}\ \sin(e_y,R)$ $lng=lng(c)+\text{arc}\ \sin(e_x/\cos(lat(c)),R) \quad (12)$ where we have first obtained z, $e_x$, $e_y$ by reversing Eq 11:

$$z = -h \Big/ \tan\left(-y\frac{\pi}{H} + \frac{\pi}{2}\right) \quad (13)$$

$$e_x = \sin\left(x\frac{2\pi}{W} - \pi + yaw(c)\right)z$$

$$e_y = \cos\left(x\frac{2\pi}{W} - \pi + yaw(c)\right)z$$

Fine Grained Classification

Figure 9:
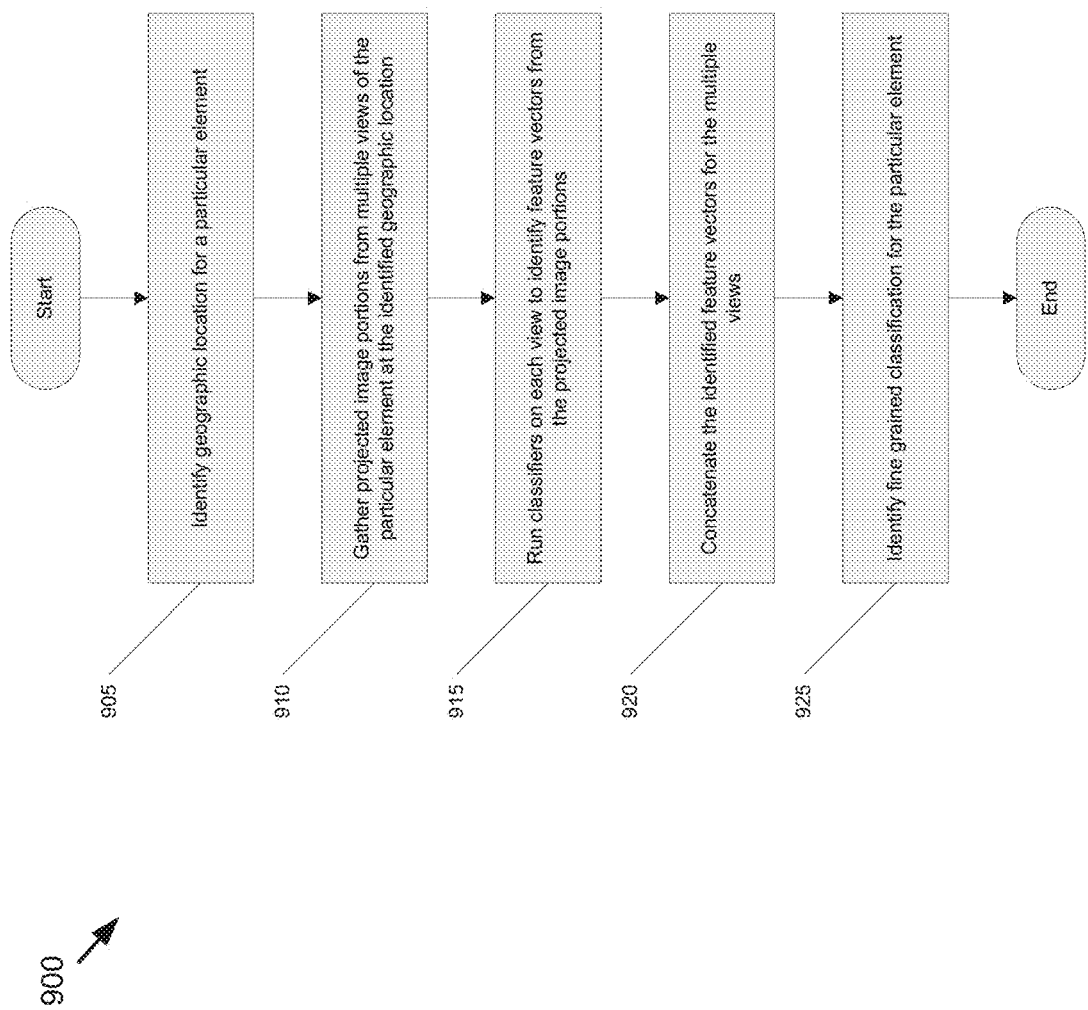
FIG. 9 conceptually illustrates a process for performing fine-grained classification for elements from multi-view image data.

A process for performing fine-grained classification of elements detected in specific geographic locations from geo-referenced image data in accordance with an embodiment of the invention is illustrated in FIG. 9. The process (900) determines a fine-grained class label of a 3D object by identifying (at 905) a geographic location for the object using any of a variety of techniques including (but not limited to) any of the various processes for determining the location of an element visible in multiple geo-referenced images described above. In certain embodiments, the geographic location of the object can simply be provided as an input to the process.

The geographic location can be utilized to gather (at 910) multiple projected image portions (i.e., portions (e.g., bounding boxes) of the image identified based on the geographic location) from multiple views of the element. In some embodiments, the projected portions are gathered using inverse projection functions $\mathcal{P}_v(\ell,c)$, such as those described above, which convert geographic coordinates to pixel coordinates of the images to identify regions with size inversely proportional to the distance of the object to the camera. As noted above, the projected image portions can be captured using any of a variety of imaging parameters including (but not limited to) different viewpoints, different zooms, different exposure times, and/or different imaging modalities.

In certain embodiments, a classifier is selected for each projected image portion based upon the imaging characteristics of the projected image portion. In several embodiments, a separate classifier is trained using images of the types of elements that can be detected using the fine-grained classification process that are captured using imaging characteristics corresponding to the characteristics of the specific projected image portion provided to the classifier as input. The imaging characteristics include (but are not limited to) type of viewpoint (e.g. street view, aerial), zoom level, resolution, imaging modality, and/or time of day. The projected image portions are provided (at 915) to the selected classifiers. In certain embodiments, the classifiers are designed to identify feature vectors. These feature vectors can then be combined or concatenated (at 920) and provided as at least one input to a classifier that performs a final fine-grained classification (at 925). In this way, the final classification can be performed based upon information obtained from each of the projected image portions.

The use of individual classifiers for each of the different input modalities (e.g., views, zoom levels, etc.) enables the system to learn the best representations for each of the individual input modalities. In addition, the combination of the several individual classifiers allows the system to learn the best combination of these individual features that are best for a particular task. For example, for a classification task to predict one of two species of tree, the features of a first input modality (e.g., street view at zoom level 1) may correspond to the shape of the tree (e.g., height, width, number of branches, etc.), while the features of a second input modality (e.g., street view at zoom level 3) may correspond to finer details of the tree (e.g., bark texture, leaf shape, etc.). For the species classification task, the system may learn that the texture of the bark is a key determinant in distinguishing between the two species of tree. The system may then place a greater importance (or weight) on the outputs generated by the individual classifier of the second input modality. On the other hand, for the task of estimating a diameter of the tree, the system may place a heavier weight on the first input modality, which provides more data regarding the shape of the whole tree. The use of the multiple classifiers and the combination those classifiers in the final classification (e.g., at 925), allows the system to collect as much information as possible from several different sources, and to learn how to best transform and combine that information to reach the final fine-grained classification.

In a number of embodiments, the individual classifiers are CNNs that are trained to generate feature vectors that enable fine-grained classification. The generation of feature vectors by training CNNs using a training data set can generate feature vectors that provide the highest fine-grained classification precision and/or recall by optimizing for the features that optimize these characteristics or another appropriate objective (as opposed to relying upon intuition to determine features that are informative).

Various different CNN architectures (e.g., VGGNet, ResNet, and Inception) could be implemented to train CNNs that generate the feature vectors for the different views. Such CNNs are effective as they are often able to produce a better representation of an image for a particular task than a human can. In some embodiments, a single architecture is used to train CNNs for each view. In other embodiments, different CNN architectures are used for the CNNs of the different views, as different CNN architectures may be optimized for different types of input. For example, in certain embodiments, CNNs of a first type of CNN architecture are used to classify RGB images in a first set of views (e.g., street view and/or aerial view imagery), while a different, second CNN architecture is used for a second set of views (e.g., LiDAR, infra-red, and other non-RGB imagery). As can readily be appreciated, the specific CNN architecture utilized is largely dependent upon the requirements of a given application.

The feature vectors generated by the CNNs can be provided to a SVM that performs a probabilistic fine-grained classification based upon the combined feature vectors. As can readily be appreciated, any of a variety of classifiers appropriate to the requirements of a given application can be utilized in accordance with various embodiments of the invention.

Figure 10:
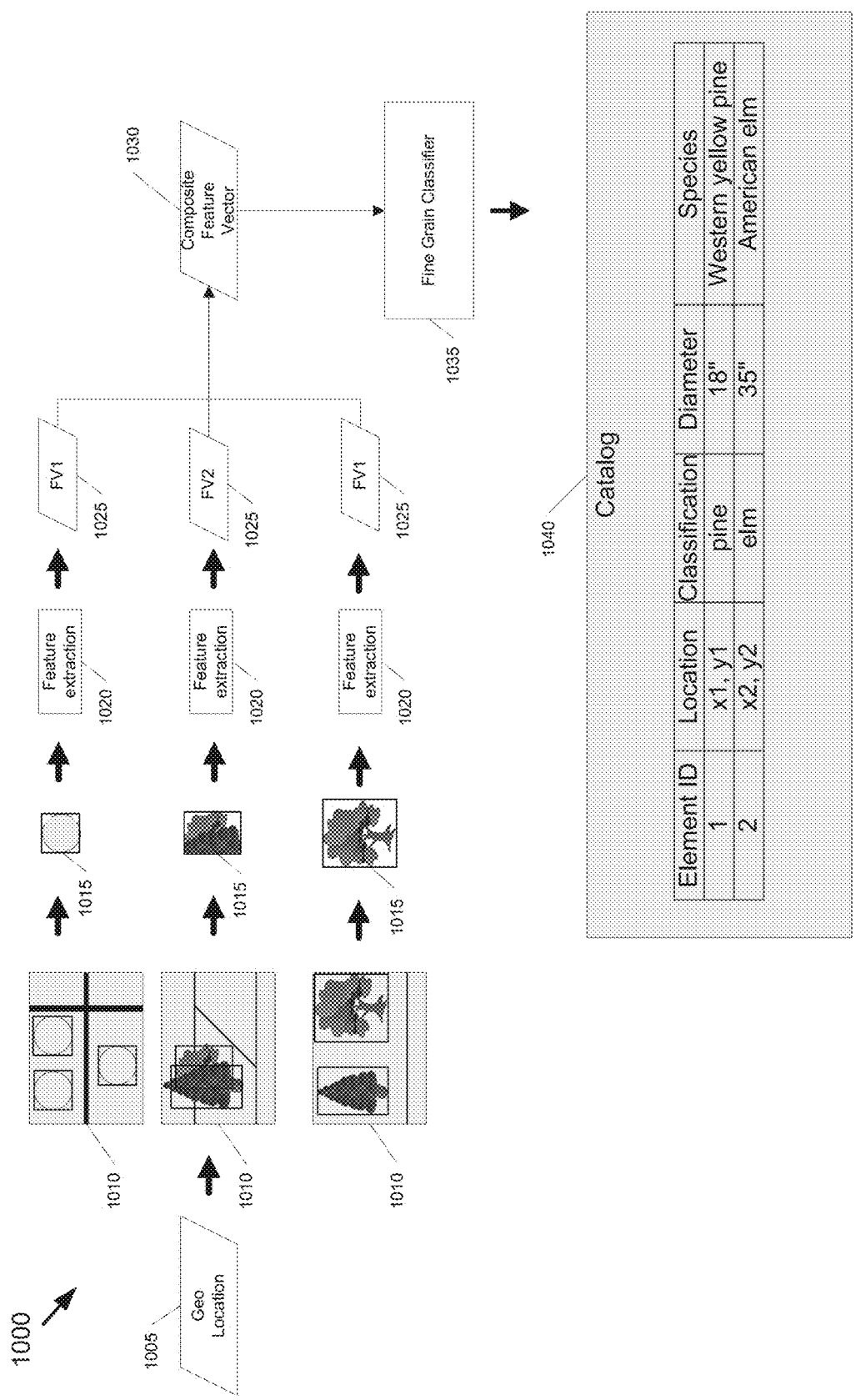
FIG. 10 illustrates an example of performing fine-grained classification for trees from multi-view image data.

A process for performing fine-grained classification of trees detected in specific geographic locations from geo-referenced images captured from multiple viewpoints in accordance with an embodiment of the invention is illustrated in FIG. 10. In the illustrated embodiment, the process (1000) receives or determines a geographic location 1005 of a tree of interest and obtains projected image portions 1015 from geo-referenced images 1020 containing multiple views of the tree located at the geographic location. In the illustrated embodiment, the multiple views include views at different zoom and/or resolution levels (including a view in which the tree of interest is partially occluded by a foreground object) and an aerial view. As can readily be appreciated, any of a variety of views can be utilized as appropriate to the requirements of a given application.

In a number of embodiments, cropped versions of each object at different zoom levels are obtained using an appropriate projection function $\mathcal{P}_v(\ell, c)$ (defined above). Each cropped region can then be fed through a CNN feature extractor. In several embodiments, the GoogLeNet CNN model (which is a version of the Inception CNN architecture) is utilized. The GoogLeNet CNN model is described in further detail in *Going Deeper with Convolutions*, the relevant disclosure from which is hereby incorporated by reference in its entirety. (C. Szegedy, W. Liu, Y. Jia, Sermanet, Reed, Anguelov, Erhan, Vanhoucke, and Rabinovich. *Going Deeper with Convolutions*, IEEE Conference on Computer Vision and Pattern Recognition, 2015.). As noted above, a separate CNN model is trained per viewpoint, resolution and/or zoom level. In certain embodiments, training can be performed using a log-logistic loss via stochastic gradient descent. In other embodiments, any of a variety of training processes can be utilized to train CNNs to generate feature vectors as appropriate to the requirements of a given application.

In many embodiments, the weights of each model are tuned after initialization to weights pre-trained on ImageNet. The learning rate can be initially set to 0.001. After every ten epochs, the learning rate can be decreased by a factor ten for 30 epochs in total. The top, fully-connected layer can be discarded in each model and features extracted from the pool/7×7 layer of the GoogLeNet model. The resulting feature vector per model has 1024 dimensions. As can readily be appreciated, any of a variety of CNNs and training parameters can be utilized in the generation of feature vectors having a number of dimensions appropriate to the requirements of a given application.

In order to perform fine grained classification, the feature vectors 1025 generated by each of the classifiers for the different views, resolutions, and/or zooms per tree are concatenated to form a single composite feature vector 1030 (i.e. a feature vector of 4096 dimensions in the case of one aerial image and street views at three different zoom levels per tree). In several embodiments, multiple panorama zoom levels are encoded in a single CNN architecture. The composite feature vector 1030 can be provided to a final fine-grained classifier 1035. In several embodiments, the final fine-grained classifier 1035 is a standard linear SVM. In many embodiments, the final fine-grained classifier 1035 can be selected from any of a number of classifiers appropriate to the requirements of a given application including (but not limited to) a neural network. The results of the fine-grained classification can be utilized to generate a catalog 1040 and/or a map layer for GISs and/or a mapping service. In the illustrated embodiment, the catalog includes an index (i.e. Element ID), a geographic location coordinate (e.g. latitude, longitude, altitude), a classification of tree species, a trunk diameter, and a fine-grained classification of the tree species. The specific characteristics of 3D objects that are recorded in a catalog typically depend upon the requirements of a given application and/or the ability to obtain a training data set containing ground truth information with respect to the characteristics of interest.

While a variety of processes for performing fine-grained classification of elements detected in specific geographic locations from geo-referenced image data are described above with reference to FIGS. 9 and 10, any of a variety of processes can be utilized for performing fine-grained classification of elements visible in multiple images as appropriate to the requirements of specific applications in accordance with various embodiments of the invention. For example, although the training of the CNNs and SVM are described as being trained independently and sequentially, in many embodiments, the parameters for the feature extracting CNNs and the fine-grained classifier are updated in a single training iteration.

In addition, the processes described above with respect to FIG. 10 are by no means limited to the fine-grained classification of trees and can be generalized to other types of 3D objects including (but not limited to) lamp posts, mailboxes, traffic lights. As can readily be appreciated, these processes can become even more relevant as more city-scale imagery becomes available (e.g., videos from driver assistance systems). Furthermore, existing priors concerning the location of 3D objects (e.g. previous surveys) can be utilized to drive continuous and/or periodic updating of data describing located 3D objects using fine grained classification (e.g. monitoring status of a 3D object such as, but not limited to, health, condition, and/or growth rate).

Building and Maintaining a Geographic Catalog

Systems and methods in accordance with various embodiments of the invention were utilized to perform various tests on a large data set from the city of Pasadena, Calif., USA with thousands of trees, for which ground truth is available from a recent tree inventory compiled by professional arborists.

Processes for detecting the geographic location of trees from multiple geo-referenced images and for performing fine-grained classification of the detected trees were performed using the Pasadena dataset. The dataset was obtained by downloading publicly available aerial and street view images from Google Maps™ at city-scale. Pasadena was chosen as a test area because 1) an up-to-date tree inventory (as of 2013) with annotated species is publicly available and 2) image data are also available as of October 2014 (street view) and March 2015 (aerial images). The Pasadena tree inventory is publicly available as a kml-file that contains rich information for $\approx$80,000 trees on public ground. These are estimated as constituting $\approx$20% of all trees in Pasadena.

Processes similar to those described above with reference to FIGS. 6 and 10 were evaluated against a specific benchmark: detecting trees of the urban forest and classifying their species. The processes were capable of distinguishing 18 different species using CNNs on RGB aerial and street view images at multiple zooms. An initial process similar to that shown in FIG. 6 found the locations of urban trees (on public land), with the help of probabilistic CRF-based fusion on CNN detector scores across views.

The dataset was split into 16 geographically separated rectangular regions (9 for training, 6 for testing, and 1 for validation). Detection performance was evaluated in terms of average precision (precision averaged over all levels of recall), which is the standard metric used in the VOC Pascal Detection Challenge. Here, candidate trees were ranked by their score combining aerial, streetview, and map imagery and spatial context (the 4 terms in detection CRF of Eq. 1 for a given tree t) and enumerated in order.

Figure 11A:
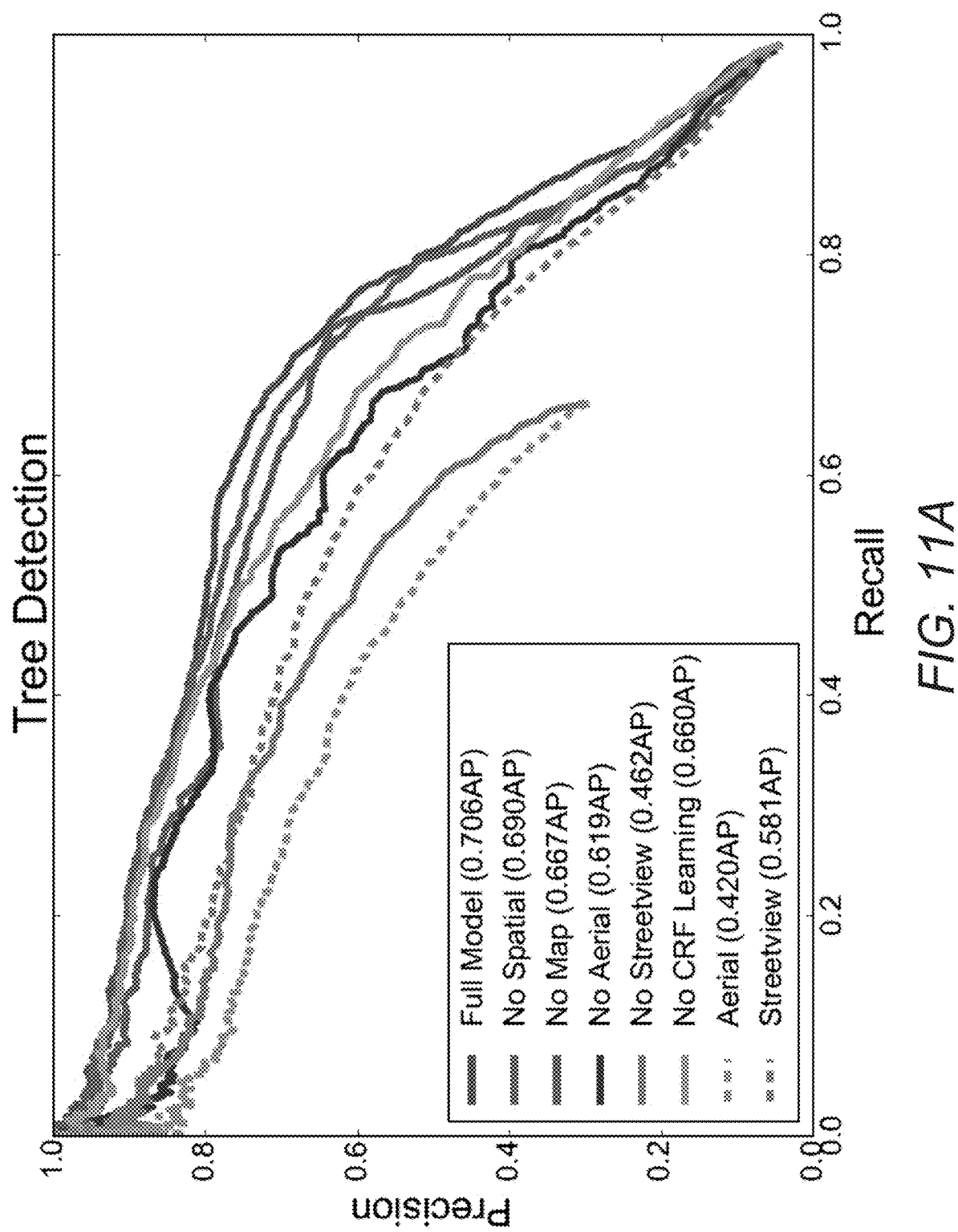
FIG. 11A illustrates results of detection using multi-view imagery for the example of detecting trees.

The processes predict the latitude and longitude of trees rather than bounding boxes, therefore, predictions within a threshold of 4 meters from ground truth were considered to be valid matches. Note that the typical difference of the utilized system from ground truth is 1-2 m, equal to ground truth accuracy. The results are plotted in FIG. 11A and are summarized below.

The results indicate that significant improvements are obtained by combining multiple views. The use of all views obtained 0.706 mAP, a significant gain over the 0.42 mAP achieved from a pure aerial view detector using the same Faster R-CNN detection system. This baseline is perhaps the most straightforward way to apply a current state-of-the-art detector to Google maps imagery without developing a way of combining multiple views. A pure street view detector achieves better performance (0.581 mAP). This is a stronger baseline because it requires using geometry to combine multiple street view images.

In many instances, penalized detections were found to be trees located on private land, which weren't included in the ground truth inventory. Thus performance in practice was better than what 0.706 mAP would indicate. Accordingly, multi-view recognition 3D objects can be shown to provide significant empirical gains over the customary single view approach: mean average precision increases from 42% to 71% for tree detection, and tree species recognition accuracy is improved from 70% to 80%.

Figure 11B:
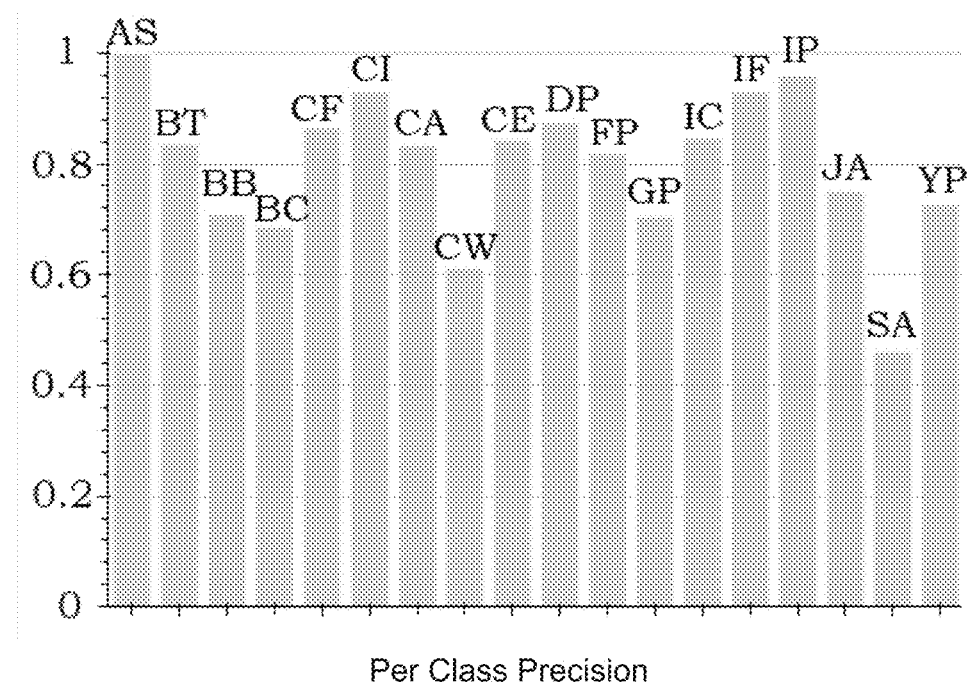
FIGS. 11B and 11C illustrate per-species level results of fine-grained classification the example of fine-grained classification for trees.
Figure 11C:
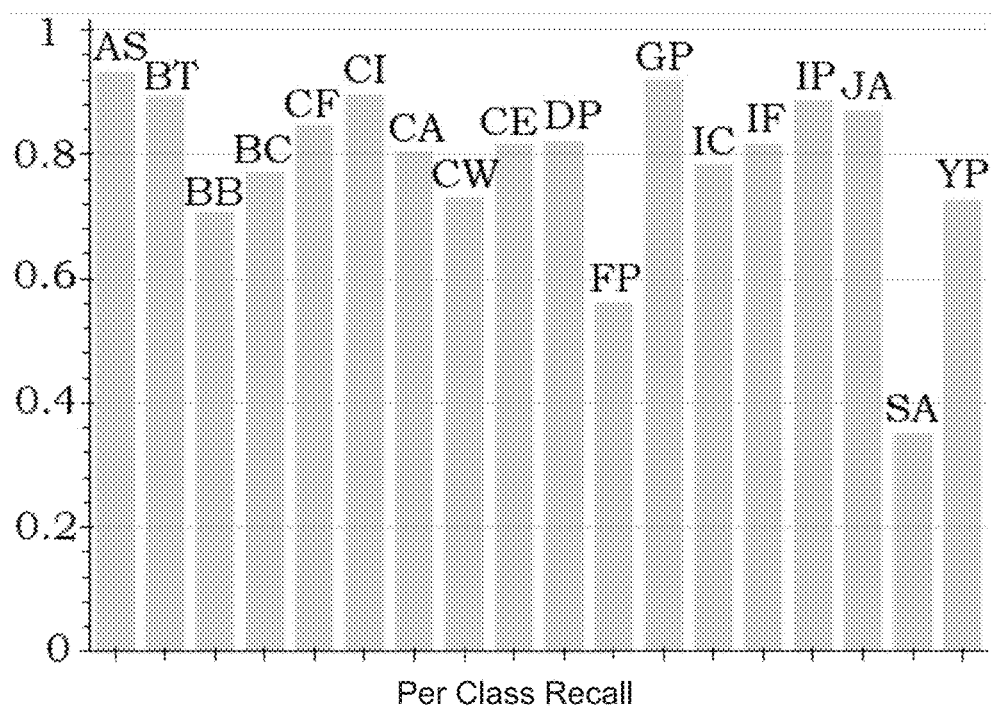

When classifying tree species based on only one image per tree (instead of three zoom levels and one aerial view), the $\approx$0.66 average precision for aerial images, and $\approx$0.70 per zoom level 40, 80, and 110. Combining features of all four models per tree, we see performance is significantly improved to $\approx$0.80 average precision and $\approx$0.79 average recall over all species. The per-species level results (i.e., precision and recall) of the fine-grained classification are plotted in FIGS. 11B and 11C.

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A method for locating and classifying elements from images, the method comprising:

receiving a plurality of geo-referenced images, the plurality of geo-referenced images comprising a first image of a first perspective and a second image of a second perspective; identifying portions of the first image corresponding to elements detected in the first image and portions of the second image corresponding to elements detected in the second image;

identifying a geographic location for each element detected in the first image using the portion of the first image corresponding to the respective element for which the geographic location is identified;

identifying a geographic location for each element detected in the second image using the portion of the second image corresponding to the respective element for which the geographic location is identified;

identifying first portions of the portions of the first image corresponding to second portions of the portions of the second image based on the identified geographic locations, the corresponding first and second portions corresponding to a particular element of the elements detected in the first and second images, where the particular element is visible in the corresponding first and second portions; and performing a fine-grained classification of the particular element based on the identified corresponding first and second portions.

2. The method of claim 1, wherein one of the first and second images comprises crowd-sourced images.

3. The method of claim 1, wherein the first perspective is an aerial view and the second perspective is a street-level view.

4. The method of claim 1, wherein the second image is captured at a first zoom level, wherein the plurality of geo-referenced images comprises a third image, wherein the third image is captured at a different, second zoom level, wherein the method further comprises:

identifying portions of the third image corresponding to elements detected in the third image;

identifying a geographic location for each element detected in the third image using the portion of the third image corresponding to the respective element for which the geographic location is identified; and identifying third portions of the portions of the third image corresponding to the first and second portions based on the identified geographic locations, where the particular element is visible in the corresponding portions of the third image, wherein performing the fine-grained classification is further based on the third portions of the third image.

5. The method of claim 1, wherein the second image is captured at a first resolution, wherein the plurality of geo-referenced images comprises a third image, wherein the third image is captured at a different, second resolution, wherein the method further comprises:

identifying portions of the third image corresponding to elements detected in the third image;

identifying a geographic location for each element detected in the third image using the portion of the third image corresponding to the respective element for which the geographic location is identified; and identifying third portions of the portions of the third image corresponding to the first and second portions based on the identified geographic locations, where the particular element is visible in the corresponding portions of the third image, wherein performing the fine-grained classification is further based on the third portions of the third image.

6. The method of claim 3, wherein the second image is captured from a first position at the street-level view, wherein the plurality of geo-referenced images comprises a third image, wherein the third image is captured at a different, second position at the street-level view, wherein the method further comprises:

identifying portions of the third image corresponding to elements detected in the third image;

identifying a geographic location for each element detected in the third image using the portion of the third image corresponding to the respective element for which the geographic location is identified; and identifying third portions of the portions of the third image corresponding to the first and second portions based on the identified geographic locations, where the particular element is visible in the corresponding portions of the third image, wherein performing the fine-grained classification is further based on the third portions of the third image.

7. The method of claim 6, wherein the method is performed by a driver assistance system of a vehicle, wherein the second and third images are gathered from the driver assistance system.

8. The method of claim 6, wherein the second and third images are panorama images captured by a 360 degree camera mounted on a vehicle.

9. The method of claim 1, wherein the plurality of geo-referenced images comprises images that capture at least a portion of the non-visible light spectrum.

10. The method of claim 1, wherein identifying a geographic location for a given element detected in the first image comprises:

identifying a first set of bounding regions in the first image and a second set of bounding regions in the second image, wherein elements are detected in the first and second sets of bounding regions;

computing detection scores for bounding regions of the first and second sets of bounding regions;

identifying a geographic location for each bounding region of the first and second sets of bounding regions;

identifying a set of potential geographic locations for the given element based on correlations between the identified geographic locations for the first and second sets of bounding regions;

calculating multi-view detection scores for each potential geographic location of the set of potential geographic locations for the given element based on the computed detection scores for bounding regions associated with the potential geographic location; and selecting the geographic location for the given element based on the calculated multi-view detection scores.

11. The method of claim 10, wherein identifying the first and second sets of bounding regions comprises:

filtering bounding regions with a detection score below a particular threshold; and filtering overlapping bounding regions using non-maximal suppression.

12. The method of claim 10, wherein identifying the geographic location for each bounding region comprises warping the bounding region to corresponding geographic locations in a geographic coordinate system.

13. The method of claim 12, wherein warping the bounding region comprises using a set of projection functions to compute a set of geographic coordinates for the bounding region.

14. The method of claim 10, wherein calculating the multi-view detection scores for each potential geographic location comprises combining the computed detection scores for the bounding regions associated with the potential geographic location.

15. The method of claim 1, wherein identifying the first and second portions of the first and second images comprises generating a bounding region within at least one of the first and second images for the particular element based on a set of inverse projection functions that identify a location and size for the bounding region based on a distance from a camera used to capture the at least one image to the associated geographic location.

16. The method of claim 1, wherein the elements are of a particular category, wherein performing the fine-grained classification comprises classifying the particular element within a sub-category of the particular category.

17. The method of claim 1, wherein performing the fine-grained classification comprises:
training a first convolutional neural net (CNN) for the first perspective and a different, second CNN for the second perspective;
using the first CNN for the portion of the first image and the second CNN for the portion of the second image to generate first and second feature vectors for the particular element; and
performing the fine-grained classification by using a concatenation of the first and second feature vectors with a support vector machine (SVM).

18. The method of claim 17, wherein training the CNNs for each of the first and second perspectives comprises using a log-logistic loss via stochastic gradient descent.

19. The method of claim 17, wherein training the first CNN for the first perspective further comprises training a CNN for each zoom level of a plurality of zoom levels, wherein the first image is captured at a first zoom level, wherein the plurality of geo-referenced images comprises a third image, wherein the third image is captured at a different second zoom level, wherein the method further comprises:
identifying portions of the third image corresponding to elements detected in the third image;
identifying a geographic location for each element detected in the third image using the portion of the third image corresponding to the respective element for which the geographic location is identified; and
identifying third portions of the portions of the third image corresponding to the first and second portions based on the identified geographic locations, where the particular element is visible in the corresponding portions of the third image, wherein performing the fine-grained classification is further based on the third portions of the third image, wherein the fine-grained classification uses a concatenation of a first feature vector of the first image from a CNN for the first zoom level, a second feature vector of the third image from a CNN for the second zoom level, and a third feature vector of the second image.

20. The method of claim 1 further comprising adding the particular element, a predicted class for the particular element from the fine-grained classification, and the identified geographic location to a catalog data structure.

21. The method of claim 1 further comprising generating a map layer that identifies the geographic location of the particular element.

22. The method of claim 1 further comprising generating notifications based on the fine-grained classification of the particular element for a driver assistance system of a vehicle.

* * * * *

UNITED STATES PATENT AND TRADEMARK OFFICE
CERTIFICATE OF CORRECTION

PATENT NO. : 10,534,960 B2  
APPLICATION NO. : 15/478101  
DATED : January 14, 2020  
INVENTOR(S) : Pietro Perona et al.

Page 1 of 1

It is certified that error appears in the above-identified patent and that said Letters Patent is hereby corrected as shown below:

On the Title Page

Item (73), please add:  
--ETH Zurich, Zurich (CH)-- as additional Assignee.

Signed and Sealed this  
Seventh Day of April, 2020

Andrei Iancu  
*Director of the United States Patent and Trademark Office*